United States Patent [19]
Wang et al.

[11] Patent Number: 6,021,500
[45] Date of Patent: Feb. 1, 2000

[54] PROCESSOR WITH SLEEP AND DEEP SLEEP MODES

[75] Inventors: Tsan-Kuen Wang, Milpitas; Samson X. Huang, Cupertino; Mustafiz R. Choudhury, Sunnyvale; Edward T. Grochowski, San Jose, all of Calif.

[73] Assignee: Intel Corporation, Santa Clara, Calif.

[21] Appl. No.: 08/852,174

[22] Filed: May 7, 1997

[51] Int. Cl.[7] .................................................. G06F 1/32
[52] U.S. Cl. .................................... 713/320; 713/300
[58] Field of Search .................................... 713/300, 310, 713/320, 322, 323, 324, 330, 400, 500

[56] References Cited

U.S. PATENT DOCUMENTS

| | | | |
|---|---|---|---|
| 5,473,767 | 12/1995 | Kardach et al. | 395/550 |
| 5,511,203 | 4/1996 | Wisor et al. | 395/750 |
| 5,560,001 | 9/1996 | Kardach et al. | 395/550 |
| 5,630,146 | 5/1997 | Conary et al. | 395/750.04 |
| 5,669,003 | 9/1997 | Carmean et al. | 395/750.04 |
| 5,737,615 | 4/1998 | Tetrick | 395/750.06 |
| 5,842,029 | 11/1998 | Conary et al. | 395/705.04 |
| 5,862,373 | 1/1999 | Pathikonda et al. | 395/556 |

*Primary Examiner*—Ayaz R. Sheikh
*Assistant Examiner*—David A. Wiley
*Attorney, Agent, or Firm*—Blakely, Sokoloff, Taylor & Zafman LLP

[57] ABSTRACT

A processor has a clock generator circuit, a sleep pin that receives an external sleep signal, and a first interface circuit coupled to the clock generator circuit and the sleep pin. The clock generator circuit generates a core clock signal and a bus clock signal in response to an external clock signal. When the external sleep signal is asserted, the processor enters a sleep state when the core clock signal and the bus clock signal are in a first predetermined relationship with each other.

20 Claims, 19 Drawing Sheets

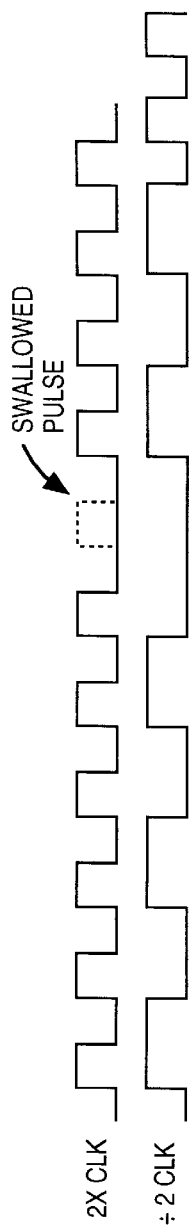
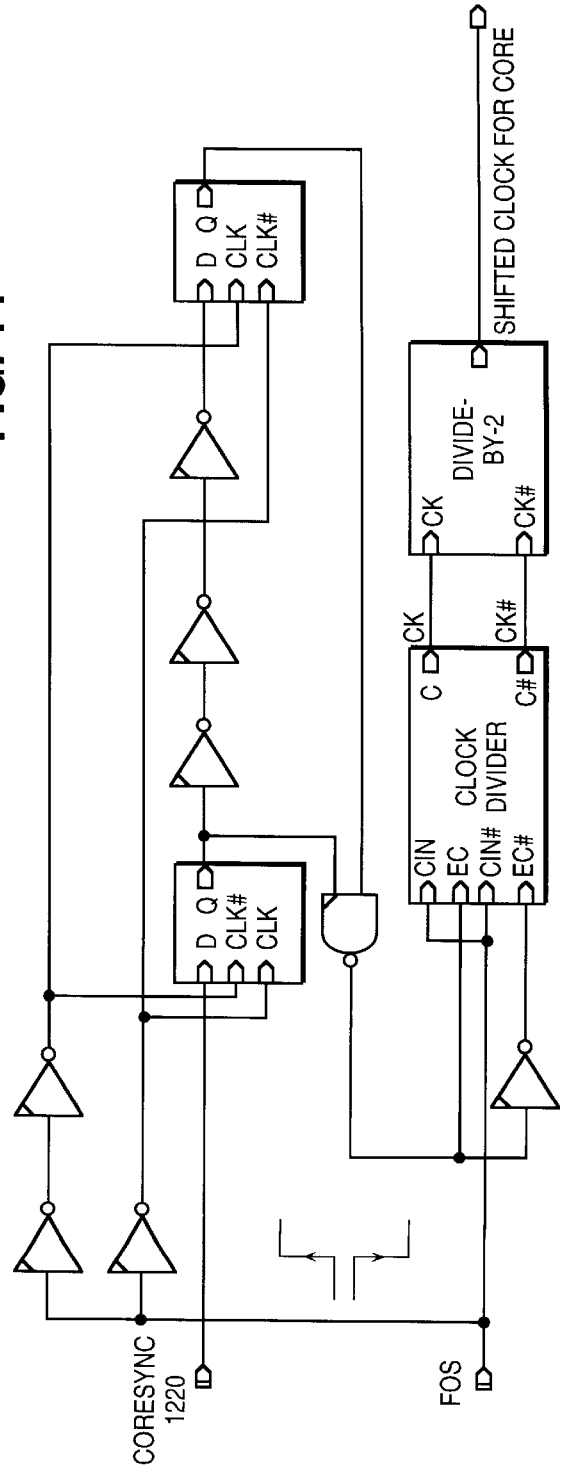
FIG. 14
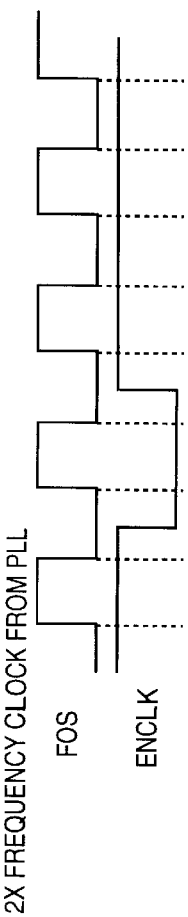
FIG. 15

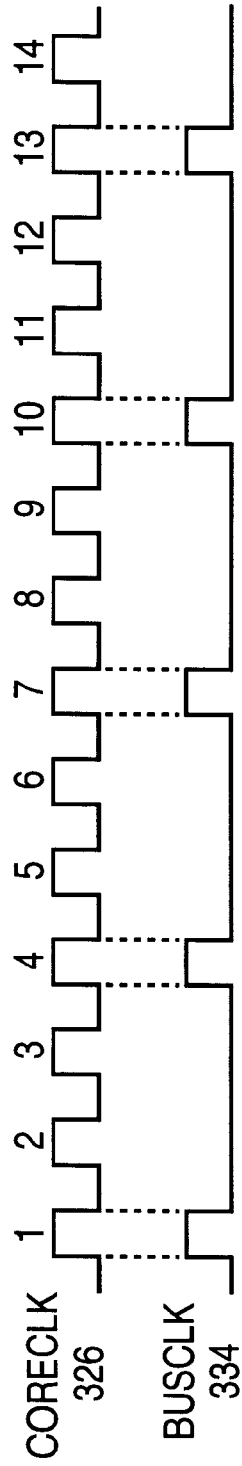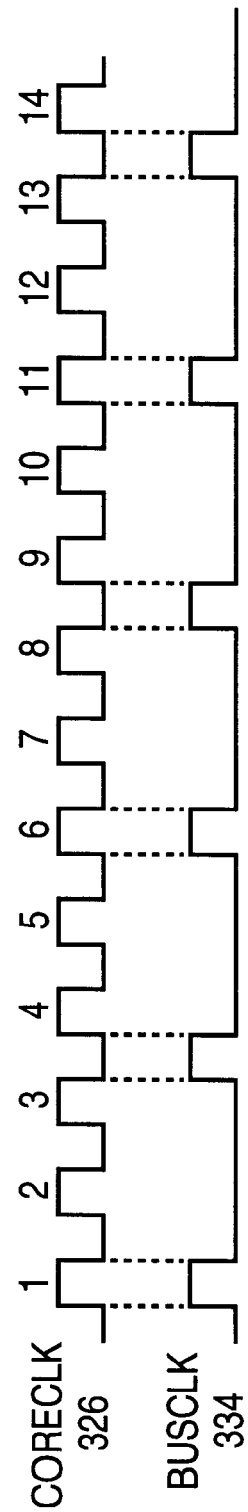

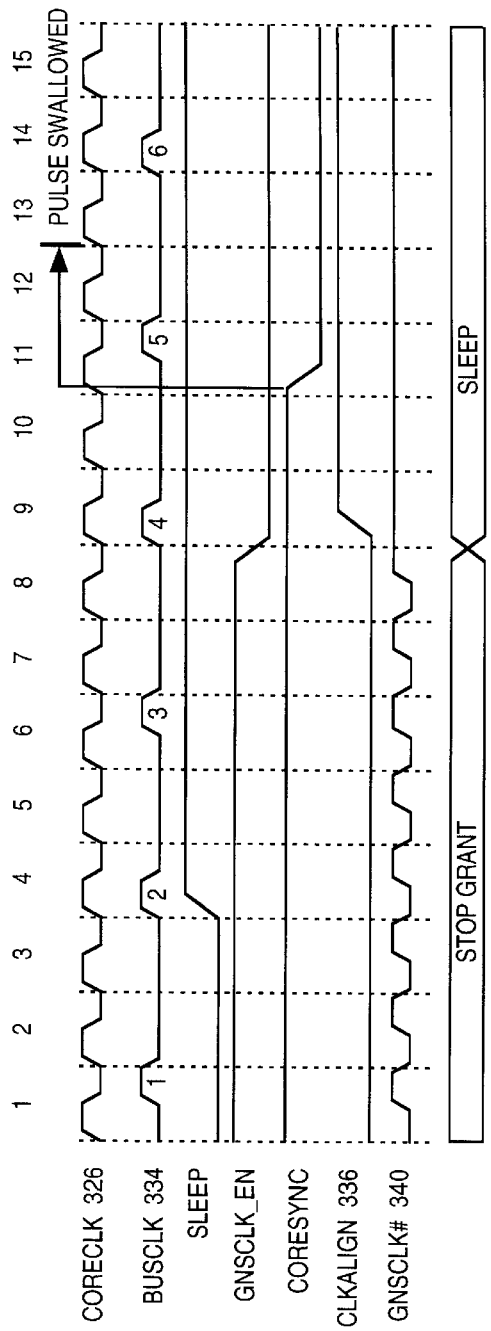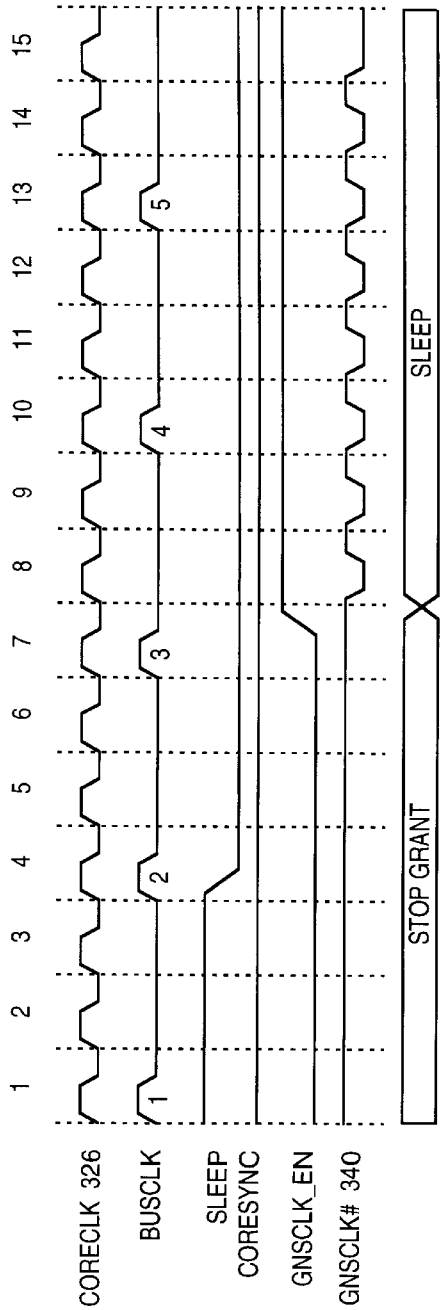

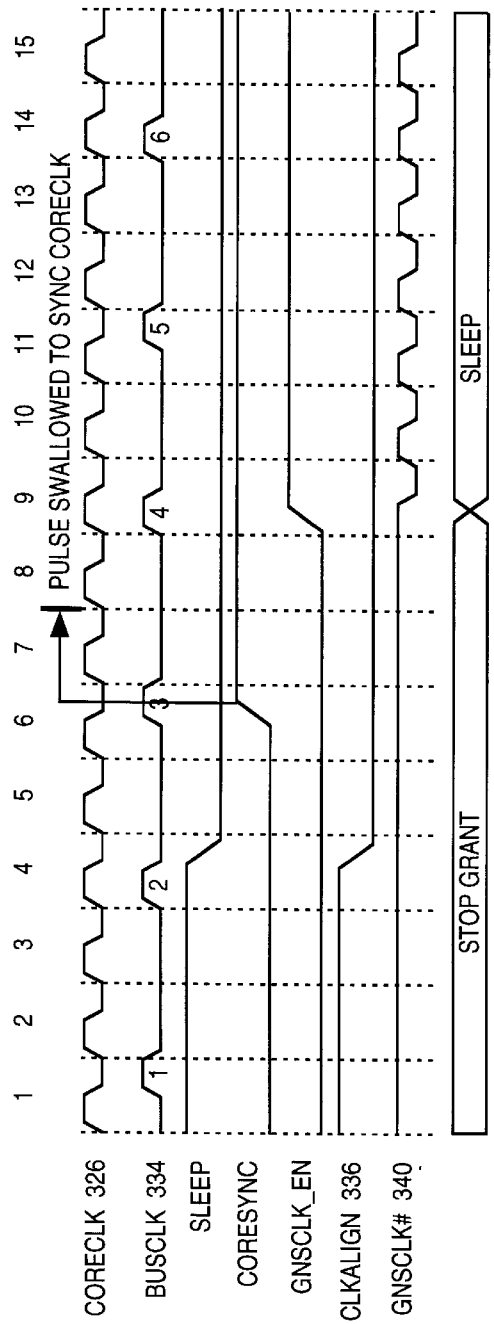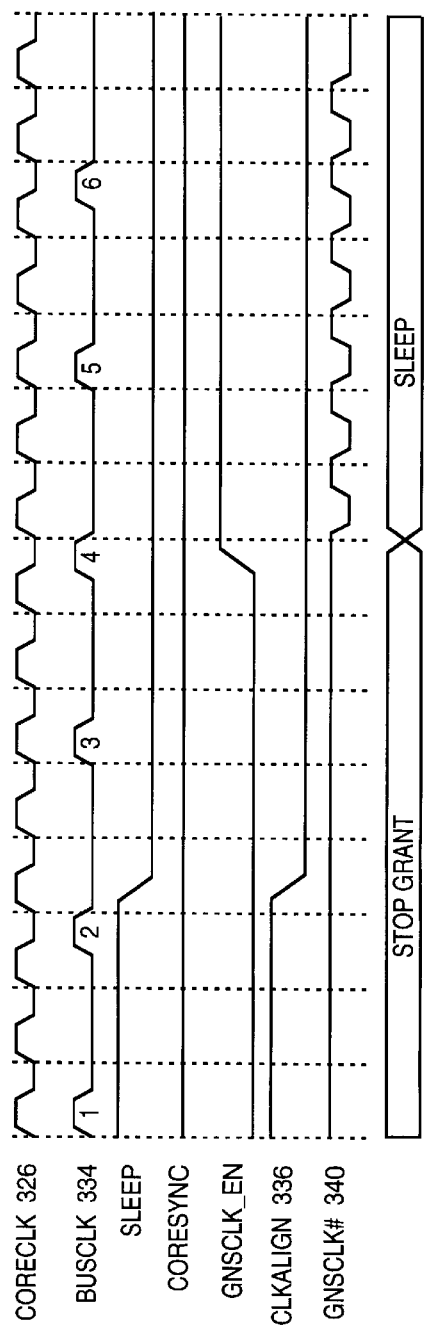

PROCESSOR WITH SLEEP AND DEEP SLEEP MODES

FILED OF THE INVENTION

The present invention relates to the field of processors and processor systems. More particularly, the present invention relates to controlling clock signals in a processor and generating different power down modes in response to the clock signals.

BACKGROUND OF THE INVENTION

Saving power in desktop and portable computers has become a very important parameter for the computer industry. The operable lifetime of a computer and/or its component circuitry may be increased by designing the components such that they can be powered down when they are not in use. Powering down a microprocessor, for example, must be done with care such that the processor is not powered down while executing an instruction or performing other work.

Many microprocessors include a phase-locked loop (PLL) circuit that multiplies an external reference clock frequency by some factor to generate the processor's internal system clock or core clock. The core clock is utilized by the processor during execution of its various functions and instructions. The core clock may be used to generate an internal bus clock that clocks the interface circuitry that communicates with external buses. One prior art 1/N mode bus clock generation scheme supports 1/N ratio of bus clocks to core clocks, where N is limited to 2, 3, or 4. In the 1/N mode clock scheme, a PLL generates a core clock signal which is at a frequency that is N times than the external reference clock received by the processor. The internal bus clock signal is then generated from the core clock to have the same frequency as the external reference clock. 2/N mode bus clock generation schemes also exist where for every N core clocks 2 internal bus clocks are generated.

In 1/N or 2/N mode, circuitry clocked by the internal bus clock operates in the "bus clock domain", and circuitry clocked by the core clock operates in the "core clock domain". In 1/N or 2/N mode, for each core clock within a bus clock period, there are associated synchronization state machines that ensure that information is transferred correctly between the bus clock domain and the core clock domain.

The core clock may be used to generate an internal general system clock that is coupled to the core circuitry of the processor such as the ALU, Cache, and instruction decode units. The core circuitry typically draws the majority of the power of the processor. Therefore, stopping the general system clock when the core circuitry is not required saves a significant amount of power. U.S. Pat. No. 5,473,767 describes a method and apparatus for controlling the stopping of the general system clock while guaranteeing the state of the processor prior to stopping the general system clock.

U.S. Pat. No. 5,473,767 discloses that one external pin STPCLK# is used to receive a STPCLK# signal and power down the processor. An internal clock signal is always left running to support circuits that often require a constant clock signal (e.g., snooping logic). These circuits will continue to draw power even when the processor is powered down. Therefore, what is needed is a mechanism that shuts off most of the circuits in the processor such that the process can draw even less power.

In the method and apparatus disclosed in U.S. Pat. No. 5,473,767, the PLL is always running. The PLL runs even when the processor is powered down by asserting the STPCLK# signal on the STPCLK# pin. The PLL will draw power while it is running. Therefore, what is needed is a mechanism for powering down the processor even further by shutting off the external reference clock and the PLL.

If the PLL is shut off by disabling the external clock signal in U.S. Pat. No. 5,473,767, it is undetermined in which core clock cycle and bus clock cycle the PLL stopped. Therefore, when the external reference clock signal is restarted and the PLL reacquires phase lock, the core clock and bus clock signals will be powered up in an indeterministic manner. That is, when the external reference clock is shut off and then turned on again, the PLL will be turned on non-deterministically such that the previous core clock/bus clock relationship may be lost. The prior described synchronization state machines between the bus clock domain and the core clock domain will then be unsynchronized, and the processor will not function properly. Therefore, what is needed is a mechanism for powering down the PLL in a deterministic manner and powering up the PLL in a deterministic manner such that internal bus clock and core clock maintain a predetermined relationship.

Processors incorporating the STPCLK# pin of U.S. Pat. No. 5,473,767 have also been difficult to test deterministically. Typically, the power drawn by the processor when the PLL is disabled is determined by measuring the power over time and observing when the power has stabilized. There is not currently a predetermined number of external reference clock cycles that a user can program into a testing apparatus such that the testing apparatus knows when to measure the specified minimum power drawn by the processor. Therefore, what is needed is a mechanism for specifying when the processor has powered down to a given powered down state in a deterministic manner, that is, in a certain number of external reference clock cycles.

Additionally, after the PLL is powered up in the 2/N clock mode, the first bus clock will either be aligned or misaligned with the core clock. Testing equipment must be programmed exactly to expect that the bus clock will be aligned or misaligned. Previously this could not be guaranteed in the processor making testing difficult if not impossible.

Therefore, what is also needed is a mechanism to ensure that after the PLL is powered up, there will be a determined alignment relationship between the bus clock and the core clock such that testing equipment may be programmed to test the processor.

SUMMARY OF THE INVENTION

A processor is described. The processor has a clock generator circuit, a sleep pin that receives an external sleep signal, and a first interface circuit coupled to the clock generator circuit and the sleep pin. The clock generator circuit generates a core clock signal and a bus clock signal in response to an external clock signal. When the external sleep signal is asserted, the processor enters a sleep state when the core clock signal and the bus clock signal are in a first predetermined relationship with each other.

Other features and advantages of the present invention will be apparent from the accompanying drawings and from the detailed description that follows.

BRIEF DESCRIPTION OF THE DRAWINGS

The present invention will be understood more fully from the detailed description given below and from the accompanying drawings of various embodiments of the invention.

FIG. 14 is a waveform diagram that illustrates one example of a 2x clock having a pulse swallowed.

FIG. 15 is a logic diagram of one embodiment for shifting a core clock in response to a CORESYNC signal.

FIG. 17 illustrates a set of 1/N mode clock signal waveforms.

FIG. 18 illustrates a set of 2/N mode clock signal waveforms.

FIG. 22 is a waveform diagram that illustrates one embodiment of entering the sleep mode in a misaligned bus clock cycle and ⅖ clock mode.

FIG. 23 is a waveform diagram that illustrates one embodiment of exiting the sleep mode in ⅓ clock mode.

FIG. 24 is a waveform diagram that illustrates one embodiment of exiting the sleep mode in an aligned bus clock cycle and ⅖ clock mode.

FIG. 25 is a waveform diagram that illustrates one embodiment of exiting the sleep mode in a misaligned bus clock cycle and ⅖ clock mode.

DETAILED DESCRIPTION

Figure 1:
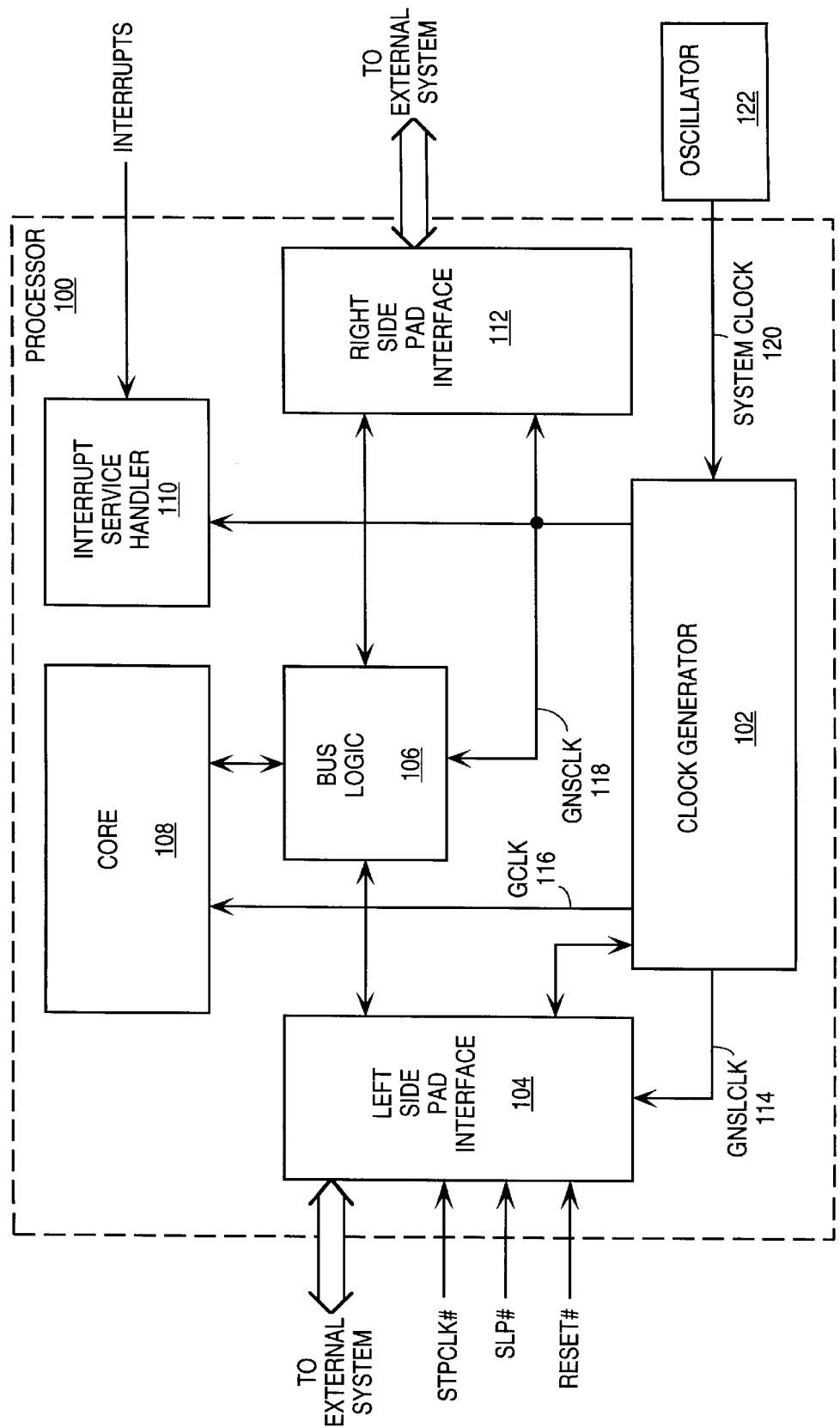
FIG. 1 is a block diagram of one embodiment of an integrated circuit of the present invention.

A stop clock circuit with sleep mode is disclosed. In the following detailed description of the present invention, numerous specific details are set forth, such as specific signal names, device frequencies, bus frequencies, 1/N and 2/N frequency ratios, etc., in order to provide a thorough understanding of the present invention. However, it will be apparent to one skilled in the art that the present invention may be practiced without these specific details. In other instances, well known circuits and devices are shown in block diagram form to avoid obscuring the present invention unnecessarily.

The present invention may be formed by transistor circuits that are readily manufacturable using well-known CMOS (complementary metal-oxide semiconductor) technology, or other equivalent semiconductor manufacturing processes. In addition, the present invention may be implemented with other manufacturing processes for making digital devices.

While in the following discussion the present invention is presented with respect to implementation in a microprocessor, the present invention is not limited to that implementation. Implementations for generating clock signals for various digital devices such as discrete logic devices, memory devices, devices either on the same or separate chips, communications devices, etc., are within the scope and spirit of the present invention.

Please note that the pound symbol "#" will be used throughout this application to denote that a signal is active when in a low logic state. These signals may also be modified to function to operate in a high logic state.

As will be described in more detail below, one embodiment of the present invention includes a processor having a sleep pin SLP# in addition to a stop clock pin STPCLK#. When a stop clock signal is asserted on the stop clock pin, the processor enters a stop grant state in which a first internal clock signal that services the core circuitry of the processor is disabled. A phase-locked loop (PLL) within the processor continues to run in the stop grant state. Particular circuitry continues to run to service events such as snooping and interrupts. When a sleep signal is asserted on the sleep pin, the processor enters a sleep state in which a second internal clock signal that services another group of circuitry in the processor is disabled. Circuitry is included within the processor to guarantee that the processor enters the sleep state when the core clock signal and bus clock signal are in a predetermined alignment relationship with each other. The processor draws less power in the sleep state than in the stop grant state. The PLL continues to run in the sleep state, but events such as snooping are no longer serviced. After the processor has entered into the sleep state, an external system clock coupled to the processor may be stopped such that the processor may enter a deep sleep state. In the deep sleep state, the PLL is stopped and the processor draws only leakage current. When the external system clock is reenabled, the PLL reacquires phase lock and the processor enters sleep state. Circuitry is included within the processor to guarantee that when the sleep signal at the sleep pin is deasserted, the processor enters the sleep state from the deep sleep state when the core clock signal and bus clock signal are in a predetermined alignment relationship with each other.

Thus, with the additional SLP# pin and its supporting circuitry that enables the processor to enter and exit the sleep state (and subsequently the deep sleep state) in a predetermined core clock cycle within a given bus clock cycle, the processor is able to maintain its context. Bus clock/core clock synchronization state machines within the processor will also be able to maintain their context. Additionally, test vectors may be accurately designed to test the sleep and deep sleep states as the processor will enter and exit the sleep state in a deterministic bus clock/core clock phase relationship when the processor is operating in either the 1/N or 2/N clock mode.

FIG. 1 shows a block diagram of processor 100 that may be implemented as a single integrated circuit. Processor 100 receives an external system clock 120 from oscillator 122. Oscillator 122 may be a crystal, clock generating circuit, digital clock circuit, or any other clock generating device. In response to system clock 120, clock generator 102 generates internal clock signals GCLK 116, GNSCLK 118, and GNSLCLK 114.

GCLK 116, GNSCLK 118, and GNSLCLK 114 may each have a frequency ratio that is 1/N or 2/N with respect to system clock 120. That is, one cycle of system clock 120 may occur for every N GCLK, GNSCLK, or GNSCLK cycles for 1/N mode. In 1/N mode, N is an integer at least equal to two. Two cycles of system clock 120 may occur for every N GCLK, GNSCLK, or GNSLCLK cycles for 2/N mode. In 2/N mode, N may be an integer at least equal to three.

GCLK 116 is the main internal clock for the processor 110 and is coupled to core circuitry 108. Core circuitry 108 may include an ALU, cache, instruction decode units, memory, a microcode unit, etc. that can be powered down when GCLK is disabled. The majority of the power drawn by processor 100 is drawn by core circuitry 108.

GNSCLK 118 is coupled to bus logic 106, interrupt service handler 110, and right side pad interface 112 which are circuits that generally need to remain active even when core circuitry 108 is inactive and GCLK 116 is disabled. This enables processor 100 to quickly transition out of a first power down mode to a full normal active mode. For example, processor 100 may need to service snoop operations or interrupts. Bus logic 106 works with left side pad interface 104 and right side pad interface 112 to control communication to and from the external system bus that may include control information, data, and address information. Interrupt service handler 110 monitors interrupt requests from other devices connected to processor 100 including non-maskable interrupt signals (NMI), interrupt signals generated by system management (SMI), and RESET interrupt signals. Right side pad interface circuit 112 includes I/O circuitry for the various I/O pins that may be supported by processor 100 as well as bus clock generation for these I/O circuits. For example, right side pad interface circuit 112 may include I/O circuitry for ECC bits (e.g., 8 bits) or data pins (e.g., 64 pins) coupled to the data bus section of the external system.

GNSLCLK 114 is coupled to left side pad interface 104. Left side pad interface 104 includes I/O circuitry for the various I/O pins that may be supported by processor 100 as well as bus clock generation for these I/O circuits. For example, left side pad interface circuit 112 may include I/O circuitry for a STPCLK# pin that receives the STPCLK# signal, a sleep pin (SLP#) that receives the SLP# signal, and the RESET# pin that receives the RESET# signal. Left pad circuitry may also include I/O circuitry for bus control signals, address parity (e.g., 2 bits), or address pins that may be coupled to the address bus section of the external system bus. Left side pad interface circuitry 104 may also include sleep logic as will be described in more detail below. Left side pad interface circuitry 104 works together with clock generator 102 to cause GNSLCLK 114 to be disabled only when the processor 100 enters into a deep sleep state when system clock 120 is shut off, and a phase-locked loop (PLL) circuit in clock generator 102 is disabled. In deep sleep state, GCLK 116, GNSCLK 118, and GNSLCLK 114 are all disabled and no clocks are running within processor 100. But, as will be described in more detail below, processor 100 can be restarted or awakened such that the clock signals are regenerated in a deterministic fashion.

Figure 2:
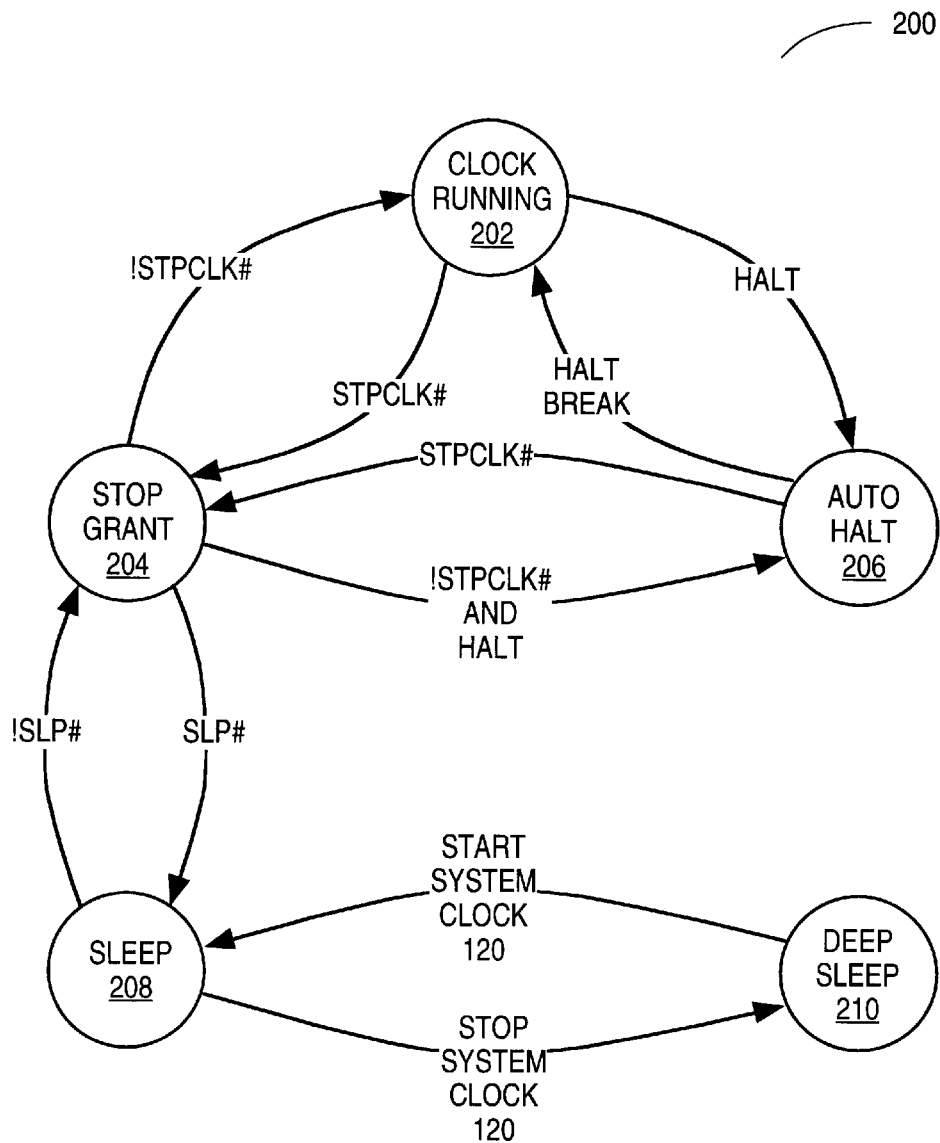
FIG. 2 is a state diagram of one embodiment of the present invention.

FIG. 2 shows state diagram 200 that illustrates the power management operation of processor 100. In clock running state 202, the system clock 120 is enabled and running, and clock generator 102 enables GCLK 116, GNSCLK 118, and GNSLCLK 114 such that processor 100 can actively execute instructions. In this state, processor 100 draws the most power. For one example, processor 100 draws approximately 5–10 Amperes of current and approximately 15–25 Watts of power. Processor 100 may draw other amounts of current and power in this state. From clock running state 202, processor 100 may enter auto halt state 206 or stop grant state 204.

When processor receives a HLT (halt) software instruction, processor 100 transitions to auto halt state 206. In auto halt state 206, clock generator 102 disables GCLK 116 to save power drawn by core circuitry 108. For one embodiment, the current and power drawn by processor 100 in auto halt state 206 is approximately 5–15% of the current and power drawn in clock running state 202. For example, the current drawn by processor 206 in auto halt state may be approximately 0.5–1.5 Amperes, and the power drawn may be approximately 1.5–2.5 Watts. Other amounts of current or power may be drawn. Processor 100 may transistion back to clock running state 202 when a halt break event occurs (e.g., an interrupt is received, RESET# is asserted, or a probe mode request is made).

Processor 100 may transistion from clock running state 202 to stop grant state 204 when processor 100 receives the STPCLK# signal on the STPCLK# pin. When stop grant state 204 is entered, a stop grant bus cycle may be issued on the external bus after all internal instructions are retired and all external bus cycles are completed. Entering and exiting the stop grant state in response to the STPCLK# signal is described in U.S. Pat. No. 5,473,767 and is hereby incorporated by reference. It may take several bus clock cycles before stop grant state 204 is issued onto the external bus depending on the bus activity and the number of instructions that need to be retired. The stop grant bus cycle will let any other devices (e.g, chip set or other processors) that are coupled to processor 100 know that processor 100 is in a power down mode but is still able to respond to some events, including interrupt events, snooping, and reset. In stop grant state 204, bus logic 106, interrupt service handler 110, and right side pad interface 112 continue to receive GNSCLK 118, and left side pad interface 104 continues to receive GNSLCLK 114. In stop grant state 204, GCLK 116 is disabled and processor 100 draws approximately the same amount of power and current in stop grant state 204 as it does in auto halt state 206. Processor 100 may exit stop grant state 204 and reenter clock running state 202 when STPCLK# is deasserted. For another embodiment, processor 100 may exit stop grant state 204 and reenter clock running state 202 upon the occurrence of a stop grant break event (e.g., RESET# or STPCLK# deasserted).

Processor 100 may alternatively enter stop grant state 204 from auto halt state 206 when processor 100 receives the STPCLK# signal on the STPCLK# pin. This will also cause a stop grant bus cycle to be generated on the external bus. Processor 100 may reenter auto halt state 206 by deasserting STPCLK#.

Processor 100 can be powered down even further by entering sleep state 208. The SLP# signal may be asserted a predetermined number of bus clock cycles (clock cycles of system clock 120) after the stop grant bus cycle has been issued after entering stop grant state 204. For one embodiment, the SLP# signal may be asserted after 100 bus clock cycles. Sleep state 208 is entered from stop grant state 204 by asserting the external sleep signal SLP# on the SLP# pin for a predetermined number of clock cycles. For one embodiment, sleep state 208 is entered 10 bus clock cycles after SLP# is asserted. This guarantees that the sleep mode is entered into in a deterministic manner and enables the sleep mode to be tested using automated testing equipment (e.g., ATE machines manufactured by LTX, Trillium, Schlumberger, or Teradyne) at predetermined times.

In sleep state 208, GNSCLK 118 is disabled such that bus logic 106, interrupt service handler 110 and right side pad interface circuitry 112 are disabled. Thus, processor 100 draws less power when in sleep state 208 relative to stop grant state 204. In sleep state 208, processor 100 draws approximately 40–60% of the current and power than in stop grant state 204. For one embodiment, processor 100 draws approximately 0.3–0.6 mA of current and approximately 0.9–1.3 Watts of power in sleep state 208. Other amounts of current and power may be drawn in sleep state 208.

As will be described in more detail below, the present invention causes GNSCLK 118 to be stopped with a predetermined relationship with the bus clock generated for right side pad interface circuit 112. Bus logic 106 includes synchronizing state machines that ensure that information is transferred correctly between the bus clock domain and the core clock domain. For example, bus logic 106 may include one synchronization state machine that is synchronized one GNSCLK cycle after a bus clock in a bus clock period, and a second synchronizing state machine that is synchronized on another GNSCLK cycle after a bus clock in the bus clock period. The present invention causes GNSCLK 118 to be stopped in a predetermined relationship with the bus clock (and external system clock 120) such that processor 100 may subsequently enter deep sleep state 210 and shut down the PLL in clock generator 102. The PLL may subsequently be restarted and processor 100 may reenter sleep state 208, stop grant state 204 and clock running state 202 with the synchronizing state machines synchronizing on the correct GNSCLK clock cycle relative to the bus clock.

While in sleep state 208, processor 100 is no longer able to respond to snoop events or interrupt events (except RESET#) because bus logic 106, interrupt service handler 110, and right side pad interface circuitry 112 are disabled. In order to respond to these events, processor 100 must transition back to stop grant state 204 by having its SLP# pin receive a deasserted SLP# signal.

In sleep state 208, GNSLCLK 114 is still running such that left side pad interface 104 and clock generator 102 are still operational and drawing power. Clock generator 102 includes a PLL that continues to run while in sleep state 208, thus the latency (i.e., number of bus clock cycles) to exit sleep state 208 and reenter stop grant state 204 may be maintained at a very low number. For one embodiment, it requires 10 bus clock cycles to reenter stop grant state 204 from sleep state 208.

From sleep state 208, processor 100 may enter its lowest power down state while maintaining its context. Processor 100 may enter deep sleep state 210 from sleep state 208 by disabling external system clock 120. In deep sleep state 210, clock generator 102 ceases to generate GNSLCLK 114 as well as GCLK 116 and GNSCLK 118. The PLL within clock generator 102 will also cease to function and there will be no clock signals enabled within processor 100. During deep sleep state 210, processor 100 will then draw only leakage current which depends on the number of transistors and other circuit elements used to implement processor 100. For one embodiment, the amount of current and power drawn by processor 100 in deep sleep state 210 may be approximately 0.1–1.0% of the current and power drawn when in sleep state 208. For example, the current drawn may be approximately 10–30 mA and the power drawn may be approximately 0.01 to 0.1 Watts. Other amounts of current and power may be drawn in deep sleep state 210.

Clock generator 102 may include a low frequency detector circuit that detects when the frequency of system clock 120 drops below a predetermined frequency or is disabled all together. For one embodiment, the low frequency detector may detect when the frequency of system clock 120 drops below 100 KHz.

When system clock 120 is disabled it may take a considerable amount of time for the PLL in clock generator 102 to shut down. This amount of time may be specified by the manufacturer of processor 100 such that it can be deterministically measured by an automatic tester. For example, processor 100 may enter deep sleep state 210 with the PLL shut off after approximately 100 $\mu$S (microseconds). Other times may be used.

To reenter sleep state 208 from deep sleep state 210, system clock 120 must be reenabled. Processor 100 will not reenter sleep state 208 until a predetermined amount of time after system clock 120 has been reenabled. This predetermined amount of time is required so that the PLL within clock generator 102 may reacquire phase lock. This predetermined amount of time may vary depending upon the PLL design. For one embodiment, the predetermined amount of time before sleep state is reentered is approximately one mS. After sleep state 208 is reentered, then stop grant state 204 may be reentered by deasserting the SLP# signal. Clock running state 202 may be reentered by deasserting the STPCLK# signal.

As will be described in greater detail below, through the use of two pins: namely, the STPCLK# pin and the SLP# pin, processor 100 is able to deterministically enter and exit sleep state 208 and deep sleep state 210 while maintaining a predetermined relationship between GCLK 116, GNSCLK 118 or GNSLCLK 114 with internally generated bus clocks as well as system clock 120. The power drawn by processor 100 in these modes can be tested by a tester because the modes are entered after a particular number of system clock cycles.

Figure 3:
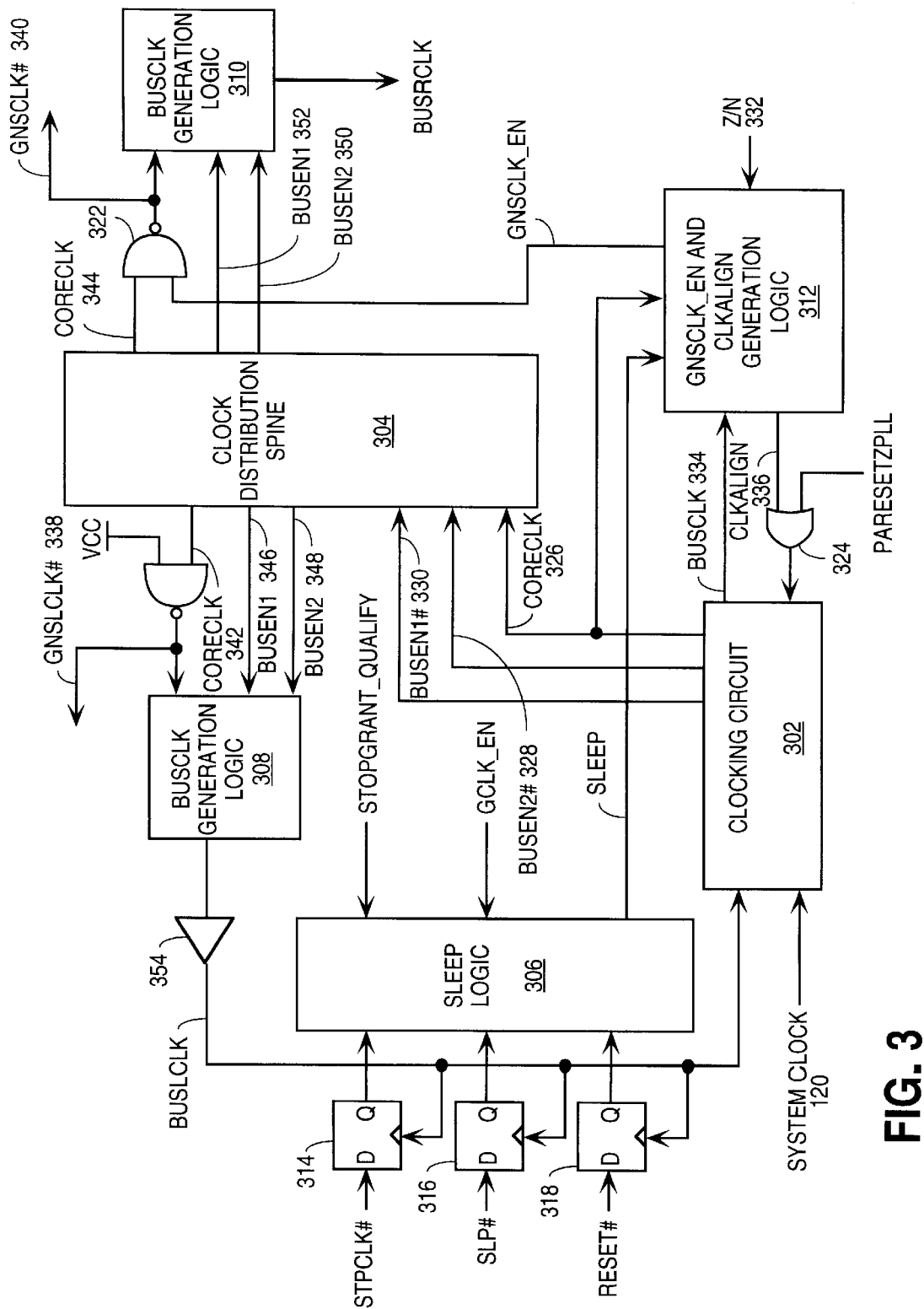
FIG. 3 is one embodiment of the left side pad interface circuit, the right side pad interface circuit, and the clock generating circuit of FIG. 1.

FIG. 3 shows one embodiment of clock generator 102 that includes clocking circuit 302, clock distribution spine or network 304, GNSCLK_EN and CLKALIGN generation logic 312, OR gate 324, and NAND gates 320 and 322. FIG. 3 further shows BUSCLK generation logic 308, sleep logic 306, and flip-flops 314, 316, and 318 that are included in one embodiment of left side pad interface circuit 104. FIG. 3 also shows BUSCLK generation logic 310 that is included in one embodiment of right side pad interface circuit 112.

Clocking circuit 302 receives external system clock 120 and generates bus clock 334, core clock 326, bus enable signals BUSEN1# 330 and BUSEN2# 328. Core clock 326 is coupled to clock distribution spine 304 and is used to generate GNSLCLK# 338 which is the logical inverse of GNSLCLK 114, GNSCLK# 340 which is the logical inverse of GNSCLK 118, and GCLK# 408 (shown in FIG. 4) which is the logical inverse of GCLK 116.

Clock distribution spine 304 routs core clock 326 and the bus enable signals BUSEN1# 330 and BUSEN2# 328 to other logic blocks. The routed signals may be inverted, buffered, or latched by clock distribution spine 304. Clock distribution spine 304 may be centrally located on processor 100 so as to minimize skew of the routed signals when applied to different circuit blocks across processor 100.

Sleep logic 306 monitors when processor 100 enters stop grant state 204 and sleep state 208 by monitoring STPCLK#, SLP#, RESET#, STOPGRANT_QUALIFY, and GCLK_EN. STPCLK#, SLP#, and RESET# are clocked into sleep logic 306 through flip-flops 314, 316, and 318, respectively, by bus clock BUSLCLK for the left side pad interface circuit. When STPCLK# is asserted to cause processor 100 to transition from clock running state 202 to stop grant state 204, sleep logic 306 receives STPCLK# after the next low to high transition of BUSLCLK. STOPGRANT_QUALIFY may be generated by an internal state machine that receives STPCLK# and detects its transitions. The internal state machine may be located within core circuitry 108. STOPGRANT_QUALIFY is used so that processor 100 will enter sleep state 208 only from stop grant state 204, but not from auto halt state 206.

GCLK_EN is deasserted when processor 100 enters either stop grant state 204 or auto halt state 206 (e.g., GCLK_EN is a logic zero). GCLK_EN deassertion will qualify STOPGRANT_QUALIFY to indicate that stop grant state 204 has been entered.

Figure 4:
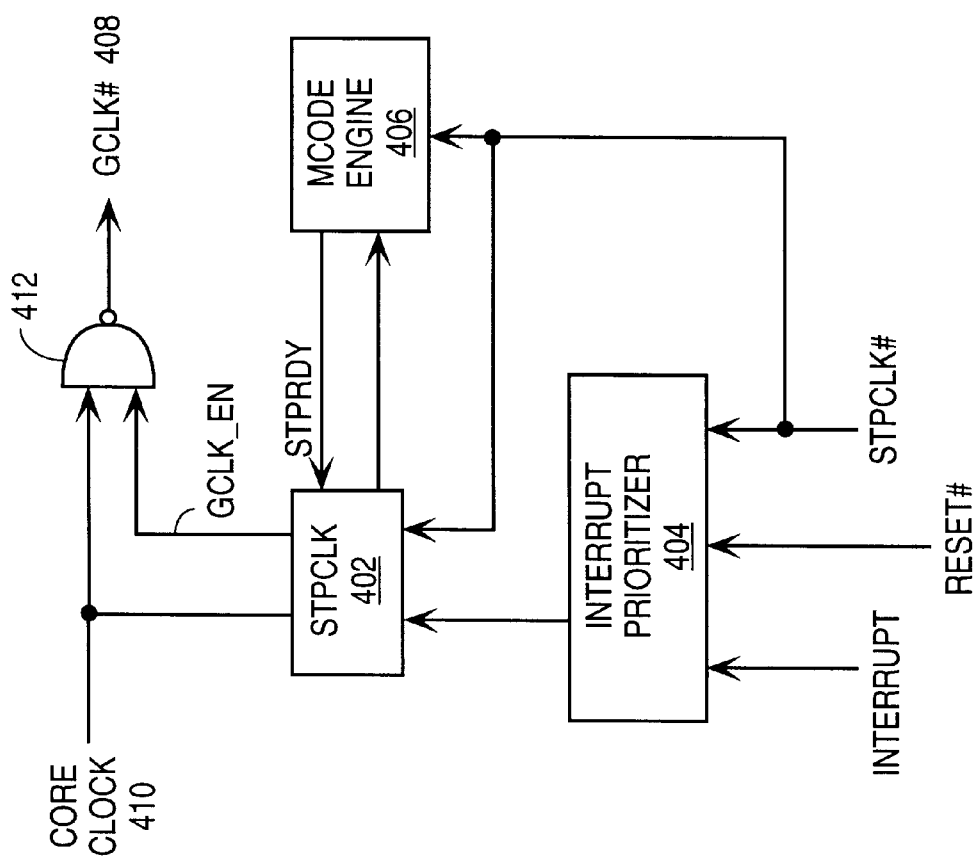
FIG. 4 is a block diagram of one embodiment of generating GCLK_EN and GCLK#.

FIG. 4 shows one embodiment of stop clock circuitry that generates GCLK_EN and GCLK# 408. In response to core clock 410 from clock distribution spine 304, and in response to GCLK_EN, NAND gate 412 generates GCLK# 408 which is the logical inverse of GCLK 116. GCLK_EN is deasserted to a low state by stop clock state machine 402 in response to interrupt prioritizer 404, microcode engine 406, and STPCLK#. When GCLK_EN is set to a low state, NAND gate 412 causes GCLK# 408 (and GCLK 116) to be disabled. The description of the detailed operation of the circuitry of FIG. 4 is described in U.S. Pat. No. 5,473,767. GCLK_EN corresponds to the inverse of STP_MY_CLK in U.S. Pat. No. 5,473,767.

With reference again to FIG. 3, sleep logic 306 will only assert the SLEEP signal when STOPGRANT_QUALIFY is asserted, GCLK_EN is in a low logic state, STPCLK# is asserted, SLP# is asserted, and RESET# is deasserted. SLEEP is coupled to GNSCLK_EN and CLKALIGN generation logic 312. GNSCLK# 340 is generated by NAND gate 322 in response to routed core clock 344 and GNSCLK_EN generated by logic 312. When logic 312 receives an asserted SLEEP signal, GNSCLK_EN is deasserted and NAND gate 322 causes GNSCLK# 340 (and GNSCLK 118) to be disabled. Sleep state 208 may then be entered.

Figure 5:
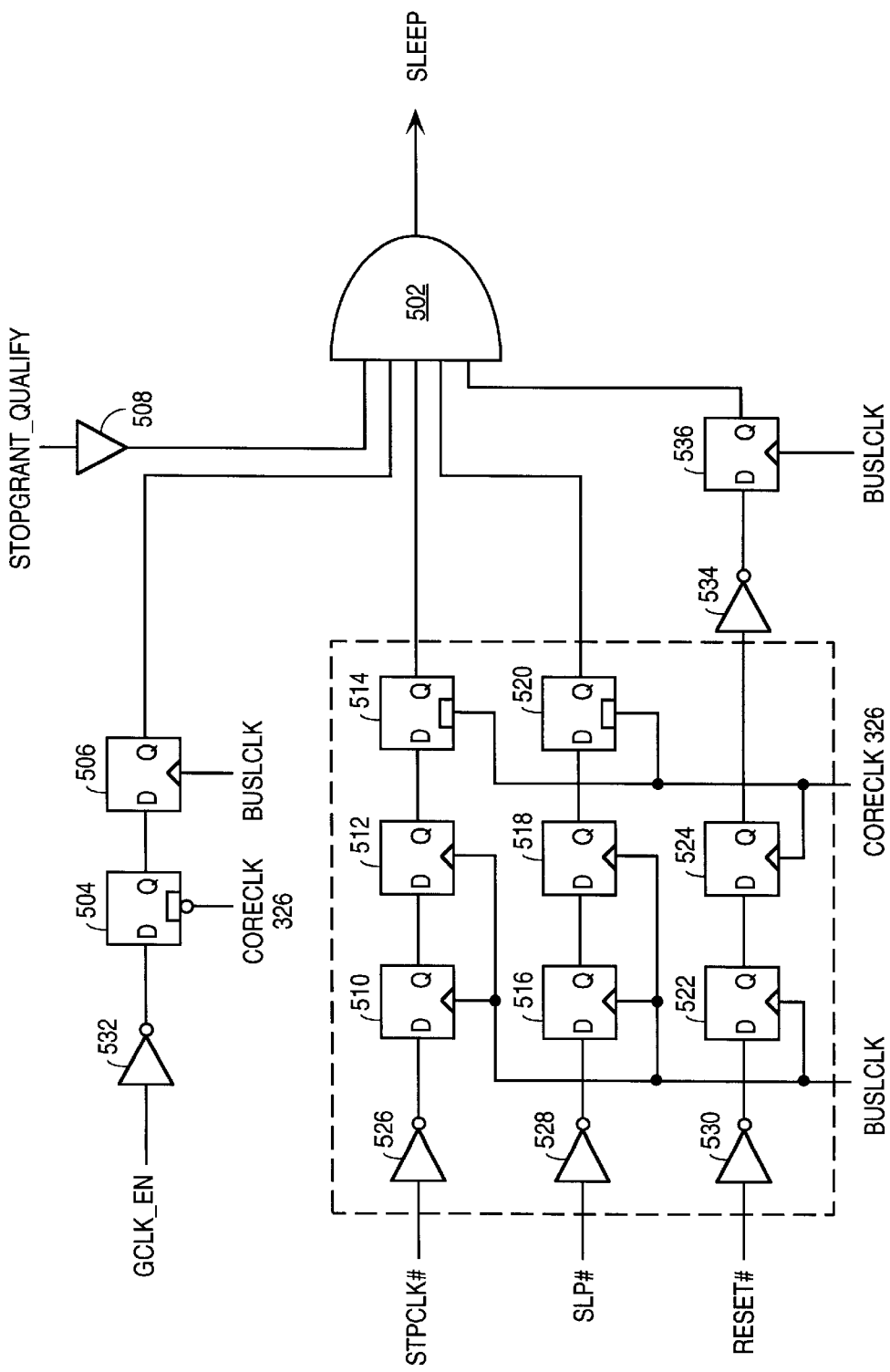
FIG. 5 is a circuit diagram of one embodiment of the sleep logic of FIG. 3.

One embodiment of sleep logic 306 is illustrated in FIG. 5. FIG. 5 includes AND gate 502 that generates SLEEP in response to: (1) STOPGRANT_QUALIFY buffered by optional buffer 508; (2) GCLK_EN that passes through inverter 532, and is clocked through half latch (transparent latch or edge-triggered flip-flop) 504 by core clock 326, and through flip-flop 506 by BUSLCLK; (3) STPCLK# that is inverted by inverter 526, clocked by BUSLCLK through flip-flops 510 and 512, and clocked through half latch 514 by core clock 326; (4) SLP# that is inverted by inverter 528, clocked by BUSLCLK through flip-flops 516 and 518, and clocked through half latch 520 by core clock 326; and (5) RESET# that is inverted by inverter 530, clocked by BUSLCLK through flip-flop 522, clocked through half latch 524 by core clock 326, inverted by inverter 534, and clocked through flip-flop 536 by BUSLCLK. Thus, only when STPCLK# is asserted, STOPGRANT is asserted, GCLK_EN is in a low state, RESET# is deasserted, and SLP# has been asserted, will SLEEP be asserted. SLEEP will only be asserted after two bus clocks of BUSLCLK plus one subsequent core clock. Other embodiments of sleep logic 306 may be used. For example, more or less flip-flops may be used in other embodiments.

Logic 312 receives bus clock 334 and core dock 326 generated by clocking circuit 302 and used to clock circuitry in logic 312. Logic 312 also receives 2/N signal 332 that when in a high logic state indicates that processor 100 is operating in 2/N clocking mode, and when in a low logic state indicates that processor 100 is operating in the 1/N clocking state. The 2/N signal may be generated by clocking circuit 302, BUSCLK generation logic 308, or by core circuitry 108. Logic 312 generates a CLKALIGN signal 336 that is input to OR gate 324. The other input of OR gate 324 is a reset signal PARESET2PLL that may be derived from RESET#. Whenever CLKALIGN or PARESET2PLL are deasserted, the core synchronizing logic in clocking circuit 302 will cause a phase shift to occur in core clock 326.

CLKALIGN 336 is asserted in the first core clock cycle after GNSCLK_EN is deasserted when operating in the 2/N clocking mode and entering sleep state 208. Thus, core synchronizing logic in clocking circuit 302 can cause a phase shift to occur in core clock 326 at a later point in time as will be described in more detail below. CLKALIGN 336 is also asserted by the SLEEP signal when processor 100 operates in the 2/N clocking mode and exits sleep state 208 such that core synchronizing logic in clocking circuit 302 can cause a phase shift to occur in core clock 326 as will be described in more detail below.

Logic 312 may also receive a 1/N signal that when in a high logic state indicates that processor 100 is operating in 1/N clocking mode, and when in a low logic state indicates that processor 100 is operating in the 2/N clocking state. The 1/N signal may be generated by clocking circuit 302, BUSCLK generation logic 308, or by core circuitry 108.

GNSLCLK# 338 is generated by NAND gate 320 in response to routed core clock 342 and VCC. So long as clocking circuit 302 continues to output core clock 326 and thus core clock 342, NAND gate 320 will continue to generate GNSLCLK# 338. When system clock 120 is disabled and processor 100 enters deep sleep state 210, the PLL inside of clocking circuit 302 will be disabled and shut off core clock 326. This will subsequently shut off core clock 342 and cause GNSLCLK# 338 to be disabled.

BUSLCLK is also a feedback bus clock signal into the PLL circuit within clocking circuit 302. BUSLCLK is output from BUSCLK generation logic 308 after being buffered by optional buffer 354. BUSCLK generation logic 308 generates BUSLCLK that is in either a 1/N or a 2/N ratio with core clock 326. As previously discussed, for every N core clock cycles, there will be one BUSLCLK cycle in the 1/N clocking mode, and there will be two BUSLCLK cycles in the 2/N clocking mode. N may be any integer value at least equal to two in 1/N mode, and at least equal to three in 2/N mode. For example, N may be 5, 7, or 9 to create such ratios as 2/5, 2/7, or 2/9 respectively. In other words, the frequency of core clock 326 is N/2 times higher than the frequency of BUSLCLK in the 2/N clocking mode, and N times higher than the frequency of BUSLCLK in the 1/N clocking mode.

Figure 6:
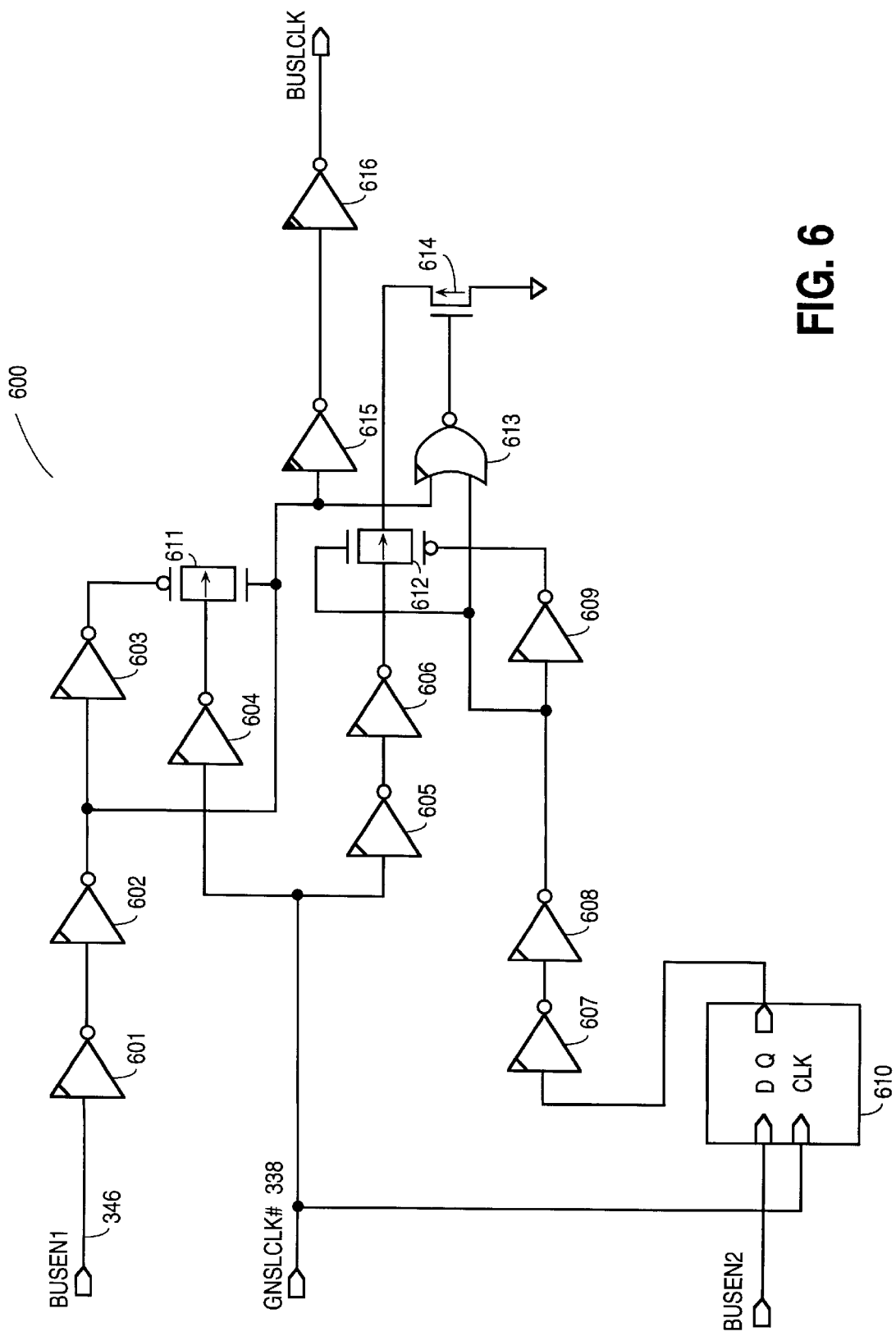
FIG. 6 is a circuit diagram of one embodiment of the BUSCLK generation logic of FIG. 3.

BUSCLK generation logic 600 of FIG. 6, is one embodiment for BUSCLK generation logic 308. BUSCLK generation logic 600 may also be used for BUSCLK generation logic 310 to generate BUSRCLK.

BUSLCLK is generated in response to GNSLCLK# 338 and bus enable signals BUSEN1 346 and BUSEN2 348. BUSEN1 346 is the logical inverse of BUSEN1# 330. BUSEN2 348 is the logical inverse of BUSEN2# 328. BUSEN1 346 is generated by clocking circuit 302 and has a high pulse aligned with core clock 326 every Nth cycle in a 1/N or 2/N clocking mode. BUSEN2 348 is also generated by clocking circuit 302 and has a high pulse in each misaligned N/2 bus clock cycle in a 2/N mode. BUSEN2 348 may remain low when operating BUSCLK generation logic 600.

BUSCLK generation logic 600 includes three inverters 601–603 coupled in series to provide an inverted BUSEN1 346 to the p-channel input of pass gate 611. The n-channel input of pass gate 611 is coupled to the output of inverter 602 and one input of OR gate 613. GNSLCLK# 338 is coupled to the input of inverters 604 and 605. The output of inverter 604 is coupled to the input of pass gate 611. The output of pass gate 611 is coupled to the input of inverter 615, the output of pass gate 612, and the drain of transistor 614. The output of inverter 615 is coupled to the input of inverter 616. The output of inverter 616 provides BUSLCLK.

The output of inverter 605 is coupled to the input of inverter 606. The output of inverter 606 is coupled to the input of pass gate 612. The n-channel input of pass gate 612 is coupled to the output of inverter 608 and the other input of OR gate 613. The output of OR gate 613 is coupled to the gate of transistor 614, and the source of transistor 614 is coupled to ground. BUSEN2 348 is coupled to the D input of flip-flop 610 that is clocked by GNSLCLK# 338. The Q output of flip-flop 610 is coupled to the series of inverters 607, 608, and 609. The output of inverter 609 is coupled to the p-channel input of pass gate 612.

Figure 7:
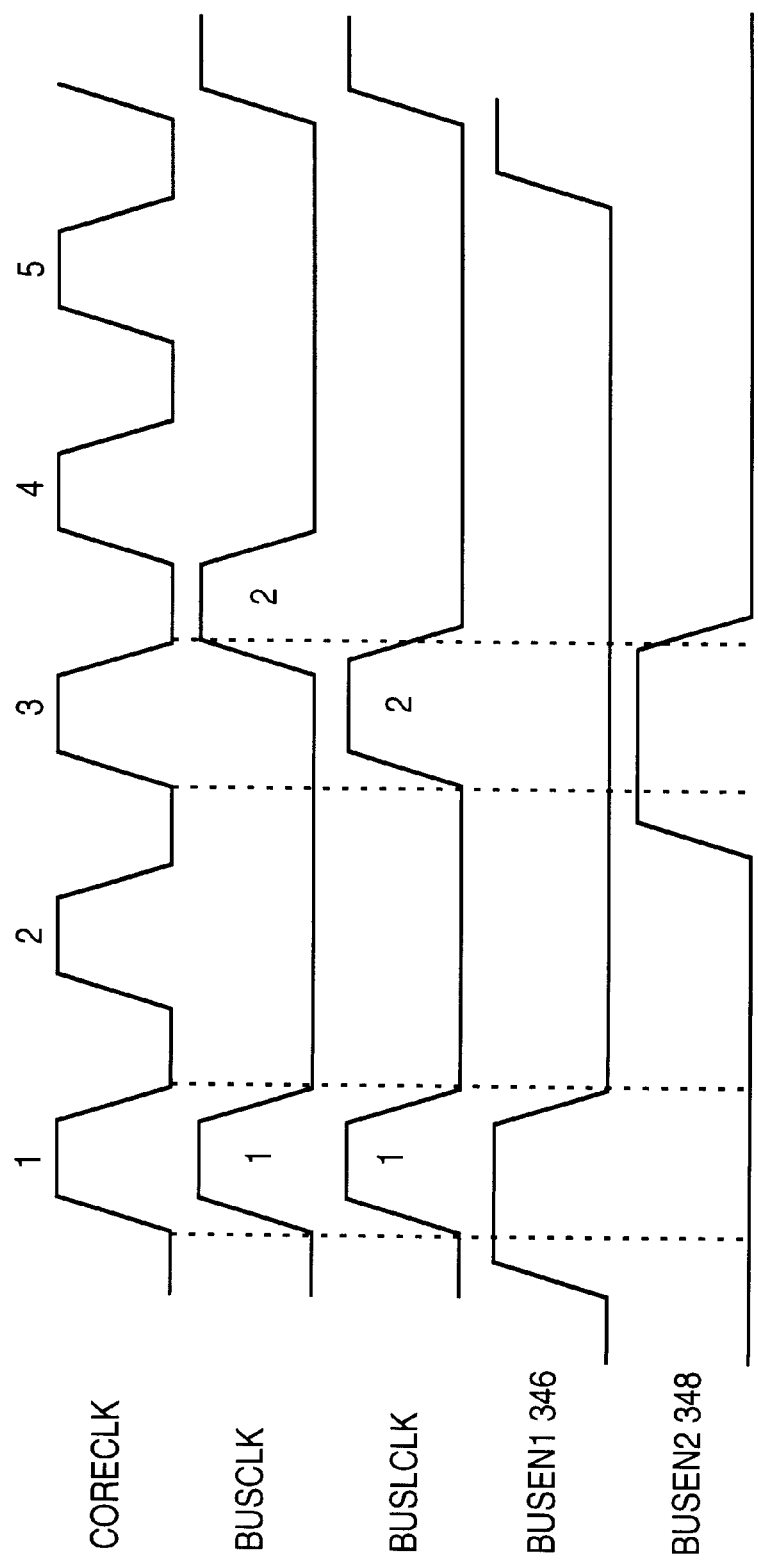
FIG. 7 is a waveform diagram that illustrates the operation of the circuit of FIG. 6.

FIG. 7 shows exemplary waveforms for BUSCLK generation logic 600 operating in a 2/5 clocking mode. Typically, a first bus clock cycle would be generated in core clock cycle 1, and a second bus clock cycle would be generated as misaligned bus clock cycle in core clock cycle 3. The BUSCLK generation logic 600 generates BUSLCLK having a first aligned bus clock cycle in core clock 1, and a second aligned bus clock cycle in core clock 3. This may simplify bus logic 106 for interfacing core 108 to the external system, and may simplify interrupt service handler 110 for controlling responses by processor 100 to received interrupts. Those skilled in the art will be familiar with the operation of BUSCLK generation logic 600.

The bus enable signals are generated by bus clock enable signal generation block in clocking circuit 302. In one embodiment, the bus clock enable signal generation block supports ratios of 2/5, 2/7 and 2/9, as well as other ratios.

Figure 8:
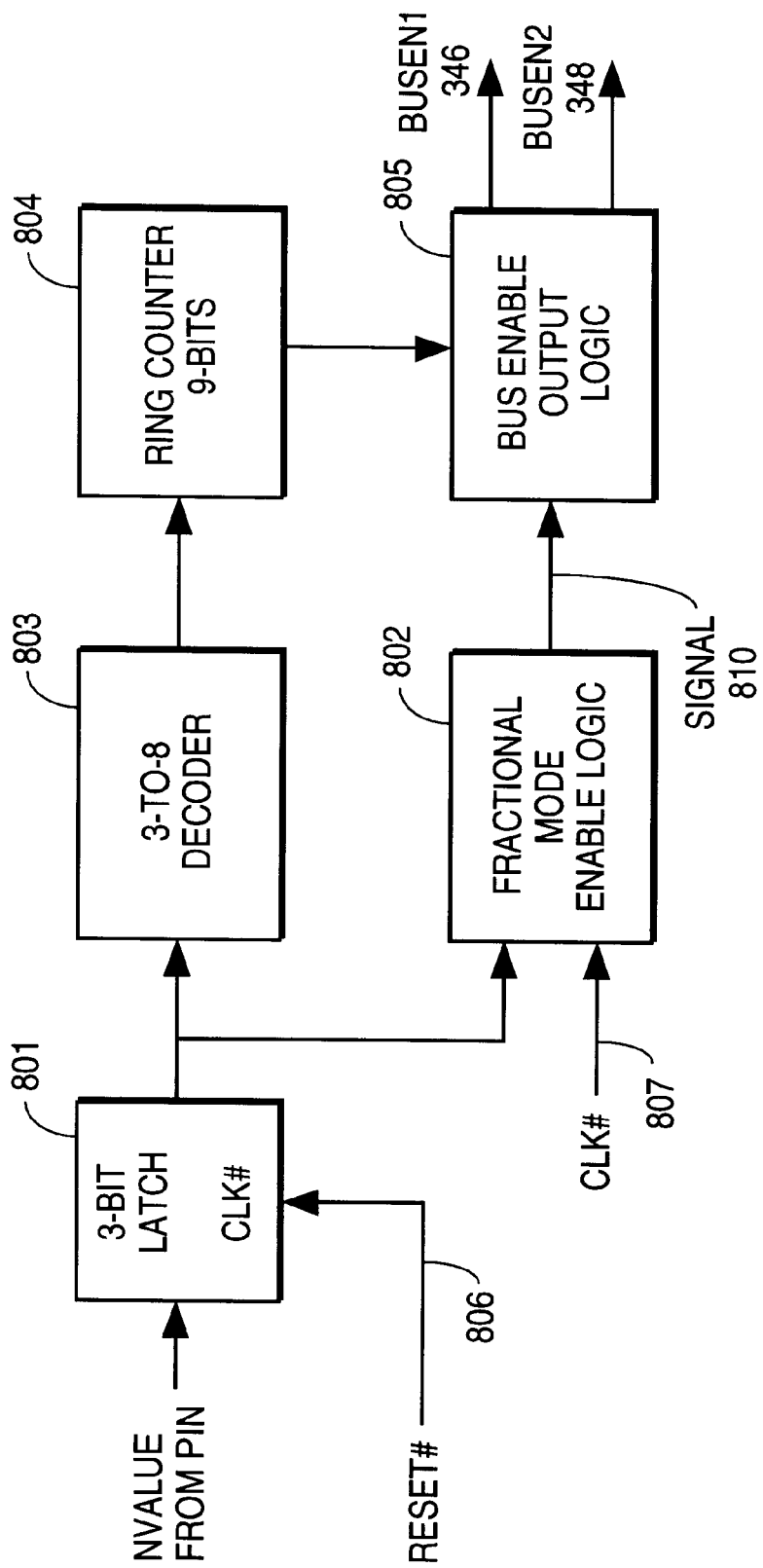
FIG. 8 is a block diagram of one embodiment of bus enable generation logic.

FIG. 8 illustrates one embodiment of the bus clock enable signal generation block of the present invention. Referring to FIG. 8, a 3-bit latch 801 is coupled to receive an M value that corresponds to the N value for the 1/N and 2/N clocking modes. In one embodiment, the M value is received from a pin. In an alternate embodiment, the M value may be received from a register (hardwired or programmed), a bond option, etc. Latch 801 is clocked by an active low (#) reset signal 806, such that whenever reset signal 806 is asserted, the value of M is latched into latch 801. In one embodiment, the reset signal 806 is asserted by another device in the system.

Latch 801 is coupled to a 3-to-8 decoder 803 and a fractional mode enable logic block 802. The fractional mode enable logic 802 latches in the value from 3-bit latch 801 in response to clock signal 807. The fractional mode enable logic block 802 determines if 2/5, 2/7 or 2/9 mode is selected and, if so, appropriately asserts a signal 810 to enable BUSEN2 348. If the fractional mode enable logic block 802 determines that a 1/N mode has been selected, then the signal 810 is not asserted, thereby causing BUSEN2 348 to be held low.

The 3-to-8 decoder 803 decodes the latched-in M value and supplies the decoded signals to a 9-bit ring counter 804. In another embodiment, an incrementer, state machine counter, shift register, etc., may be used to provide similar functionality to control the bus enable generational logic. Ring counter 804 strobes the bus enable output logic 805, causing the bus enable output logic 805 to output BUSEN1 346 and BUSEN2 348 with the appropriate timing.

In one embodiment, the bus enable output logic 805 may be implemented in a manner similar to FIG. 10 described below. Also, if a 1/N mode is selected, such bus enable output logic 805 may be simplified to only output a single enable signal.

In one embodiment, decoder 803 and ring counter 804 support the bus to core clock ratios shown in Table 1:

TABLE 1

Bus to Core Clock Ratio Selection

| M Value | Ratio |
|---------|-------|
| 000 | 1/2 |
| 001 | 1/3 |
| 010 | 1/4 |
| 011 | 1/2 |
| 100 | 1/2 |
| 101 | 2/7 |
| 110 | 2/9 |
| 111 | 2/5 |

In one embodiment, a single composite bus clock enable signal representing a logical OR of the two bus enable signals 346 and 348 may be used. This composite bus clock enable signal may be ANDed with the core clock signal to produce a bus clock signal. Use of the composite bus clock enable signal reduces the routing overhead on the processor; however, it does not eliminate the space required for decoding the composite bus clock enable signal.

Figure 9:
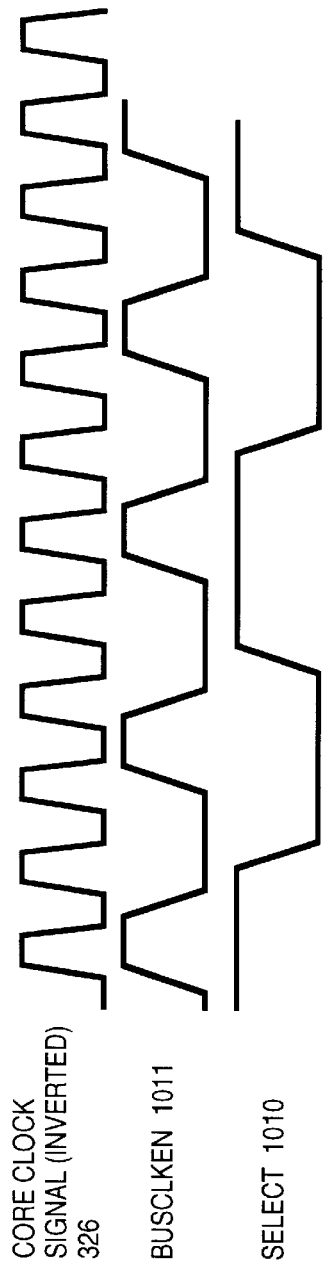
FIG. 9 is a waveform diagram that illustrates one embodiment of separating two bus clock enable signals from a composite bus clock enable signal.
Figure 10:
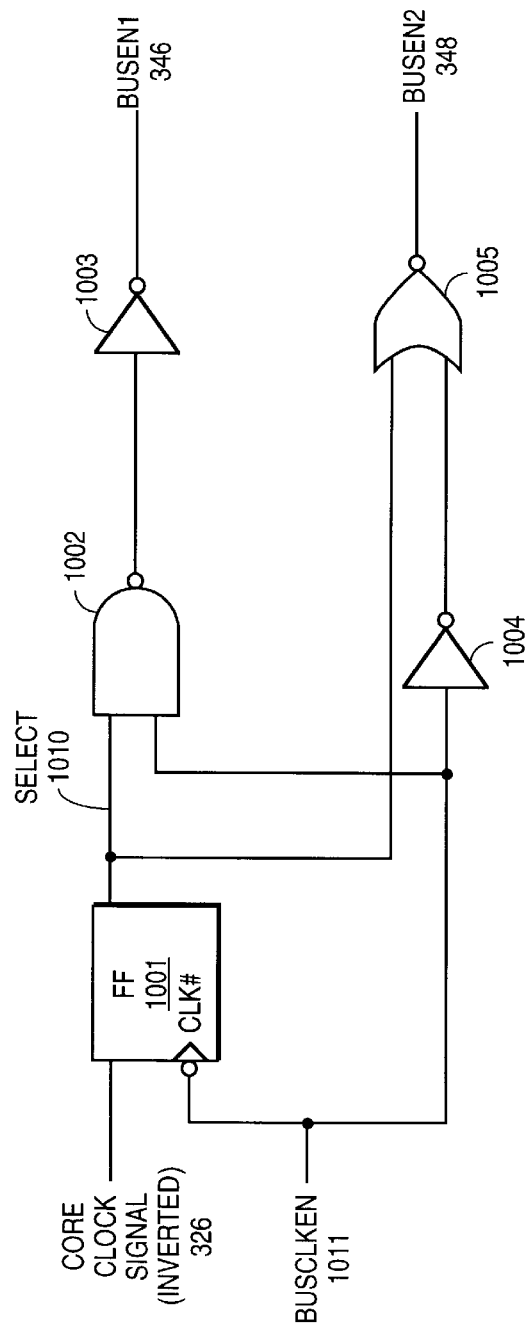
FIG. 10 is a logic diagram of one embodiment of separating two bus clock enable signals from a composite bus clock enable signal.

FIGS. 9 and 10 illustrate a scheme for separating two bus clock enable signals from a composite bus clock enable signal. Referring to FIG. 9, waveforms of the system core clock 326, the composite bus clock enable signal 1011 and the select signal 1010 are shown. The select signal 1010 indicates which bus clock enable signal, BUSEN1 or BUSEN2, is being pulsed.

Referring to FIG. 10, the bus enable generation circuitry comprises a flip-flop clocked by the bus clock enable signal 1011. The data input of flip-flop 1001 is coupled to an inverted version of the core clock signal 326. On each pulse of the composite bus clock enable signal 1011, a clock cycle is output as a select signal 1010 to an input of NAND gate 1002. The other input to NAND gate 1002 is coupled to the bus clock enable signal 1011. The select signal 1010 is also coupled to one input of NOR gate 1005. The other input to NOR gate 1005 is coupled to the output of inverter 1004, which is coupled to receive the composite bus clock enable signal 1011. The output of NAND gate 1002 is coupled to an input of inverter 1003. The outputs of inverter 1003 and NOR gate 1005 are BUSEN1 346 and BUSEN2 348, respectively. The operation of the bus enable generation circuitry of FIG. 10 would be within the understanding of those skilled in the art.

In 2/N mode, the falling edge of the composite bus clock enable signal 1011 samples the high and low phase of the core clock signal 326 alternately. This sampling causes the select signal 1010 to toggle every falling edge of composite bus clock enable signal 1011. The select signal 1010 is then used to transfer alternate pulses of the bus clock enable signals BUSEN1 and BUSEN2 as outputs.

Synchronization may be required in the testing environment. For instance, during silicon debugging, it is essential that the core clock signal and the bus clock signal be in a predetermined phase relationship to make tests reproducible every time. Particularly, it is desirable to have the core clock signal and bus clock signal to be in a predetermined phase at the time reset is deasserted or CLKALIGN 336 is deasserted. Although a reset event is used, any synchronization point may be used to identify when the bus and core clock signals are in phase. Because of these reasons, the core clock signal is synchronized to the bus clock in the 2/N mode. Note that synchronization may not be needed in a 1/N mode since the bus clock signal and core clock signals are always in phase.

In the present invention, synchronization is performed with respect to the deassertion of the external reset signal or deassertion of the CLKALIGN signal 336 in FIG. 3. When reset or CLKALIGN is being deasserted, the phase relationship between the bus clock signal and the core clock signal is examined. If both are not in the high phase, the phase of the core clock signal is corrected to match that of the bus clock signal. Thus, the phase of the core clock signal is checked the time that reset or CLKALIGN is deasserted. If the core clock signal is in the low phase, then the core clock signal and bus clock signal are assumed to be in opposite phases. In this case, the core clock signal must be corrected to synchronize these clock signals. If the core clock signal is in the high phase, no action needs to be taken on the core clock signal to correct its clock phase. Note that in the present invention, correction is applied to the core clock signal only.

Figure 11:
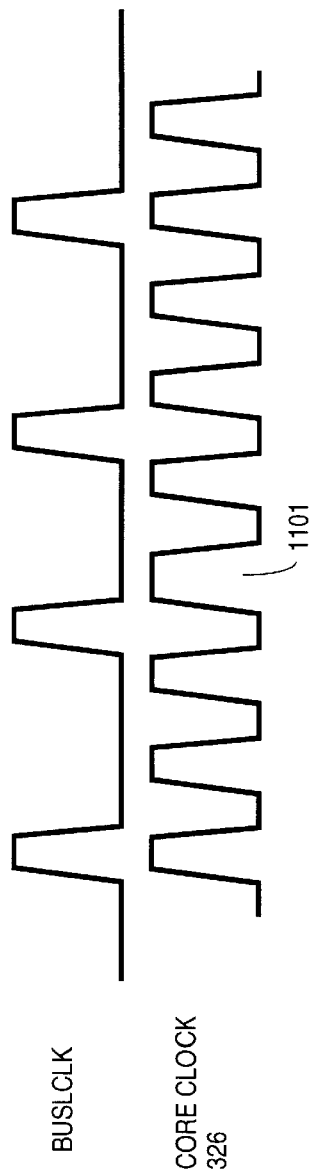
FIG. 11 is a waveform diagram that illustrates a shifted core clock signal.

In one embodiment, the correction of the core clock signal is performed by shifting the core clock signal by one phase. Note that it is vital that the bus clock signal does not move or glitch because of the core clock correction. Otherwise, the PLL in clocking circuit 302 will go out of lock. Such a shifted pulse is shown in FIG. 11 where pulse 1101 is shown shifted to enable a correction.

Figure 12:
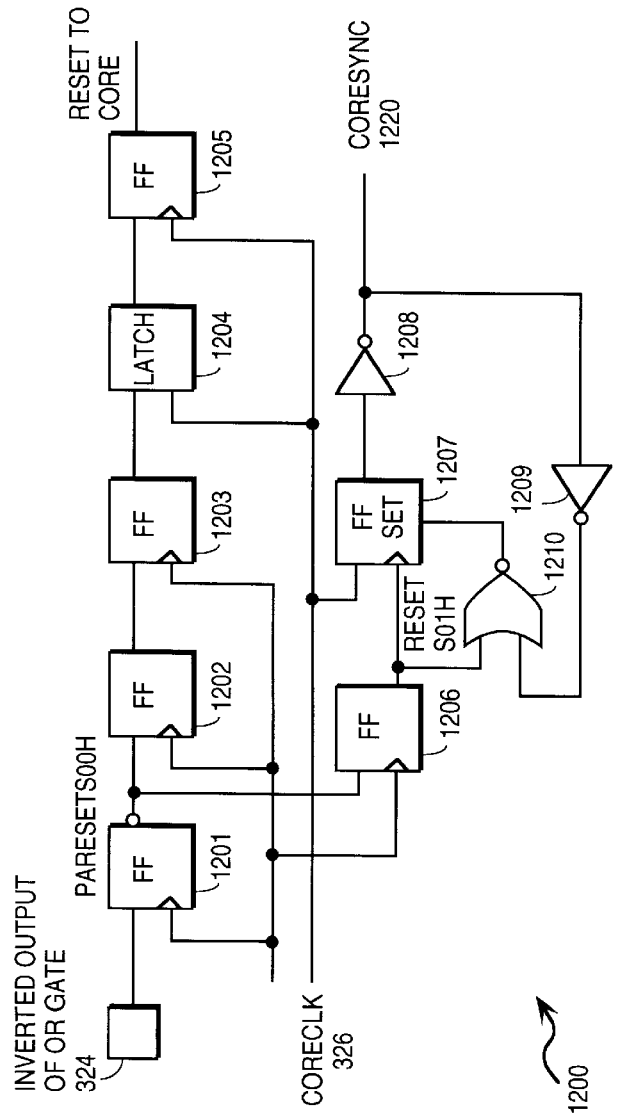
FIG. 12 is a logic diagram of one embodiment of core clock synchronization logic generating a CORESYNC signal.
Figure 13:
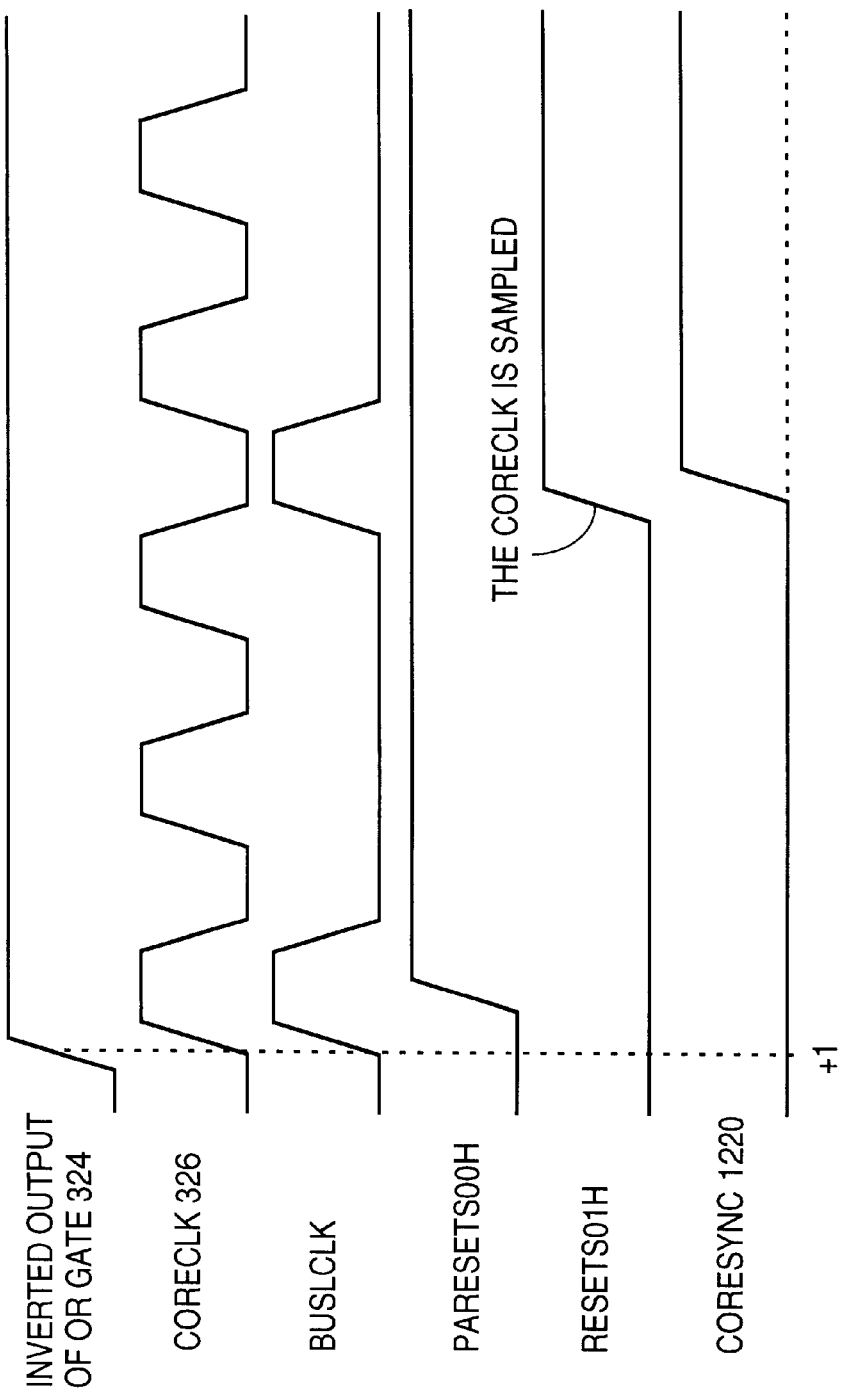
FIG. 13 is a waveform diagram illustrating the operation of core clock synchronization logic of FIG. 12.

FIGS. 12 and 13 illustrate one embodiment of detector logic or core clock synchronization logic and associated waveforms, respectively, for a sync signal generator. The detector logic determines whether the phases of BUSLCLK and core clock 326 are matching or not. Referring to FIG. 12, the detector logic 1200 comprises flip-flops 1201–1203, 1205–1207, inverters 1208 and 1209, latch 1204 and NOR gate 1210. Flip-flop 1201 is an inverting flip-flop. Flip-flops 1201–1203, latch 1204, and flip-flop 1205 are coupled in series, with the data output of one being coupled to the data input of the other, to generate the reset signal to the processor core. The data input of flip-flop 1201, the first in the series, is coupled to receive the output of OR gate 324 in FIG. 3 or an active low reset signal from a pin. The output of flip-flop 1201 is the PaResetSOOH signal and is fed to the inputs of flip-flops 1202 and 1206. Flip-flop 1205 generates the reset signal to the core of the processor. Flip-flops 1201–1203 are clocked by BUSLCLK, while latch 1204 and flip-flop 1205 are clocked by core clock 326. Latch 1204 removes the phase path to the core because the signal is being transferred from a slow clock domain (the bus clock domain) to a fast clock domain (the core clock domain). Therefore, the use of latch 1206 eliminates race condition.

Flip-flops 1206 and 1207 along with inverter 1208 are coupled in series with the data input of flip-flop 1206 being coupled to the data output of flip-flop 1201. Flip-flop 1206 is docked by BUSLCLK. The output of flip-flop 1206 (ResetS01H signal) clocks flip-flop 1207 which receives the core clock 326 on itse data input. The output of flip-flop 1207 is coupled to the input of inverter 1208. The output of inverter 1208 is the core sync signal 1220 and is also coupled to the input of inverter 1209 which feeds back the core sync signal 1220 to one input of NOR gate 1210. The other input of NOR gate 1210 is the output of flip-flop 1206. The output of NOR gate 1210 sets flip-flop 1207.

The output of OR gate 324 is received by flip-flop 1201 in response to the BUSLCLK and is repeatedly "flopped" to set the correct timing for the reset signal to arrive at the processor core. During the time the reset signal is propagating through the serial chain of flip-flops and latches 1201–1205, the reset is used as a clock to flip-flop 1207 after being provided by flip-flop 1206, which is clocked by BUSLCLK. By being clocked in by BUSLCLK, the reset signal has the same, or coincident, phase with BUSLCLK. When the reset signal from flip-flop 1206 clocks flip-flop 1207, the core clock 326 is input into flip-flop 1207. If both the reset signal and the core clock 326 have the same phase, then the input "flopped" is the same as the reset signal; otherwise, it is different than the reset signal. If BUSLCLK and core clock 326 are mismatching in phase, then the core sync signal 1220 is zero. If they are matching in phase, the core sync signal 1220 is a one.

The feedback inverter 1209 in conjunction with NOR gate 1210 ensure that core sync signal 1220 preset low when the RESET# signal is asserted (i.e., when the system goes into reset).

FIG. 13 illustrates the detector signal waveforms associated with the detector logic of FIG. 12. As shown in FIG. 13, the inverted output of OR gate 324 is deasserted (i.e., goes high), at time $t_1$. When this occurs, the reset signal for the processor eventually goes high. The core clock signal 326 is sampled by flip-flop 1207 causing the core sync signal 1220 to go high if there is a phase mismatch (solid line). If there is no phase mismatch, the core sync signal 1220 remains low (dotted line). Therefore, based on the state of the core sync signal 1220, the correction is made.

As discussed above, correction of the core clock 326 is performed by shifting the core clock 326 one phase. In one embodiment, in order to shift the core clock 326, the present invention uses the 2x frequency of the core clock 326 generated from the PLL in clocking circuit 302. The PLL generates twice the frequency of the core clock 326 and is divide-by-two (via a divide-by-two counter) to obtain the 50% duty cycle core clock signal. Because the PLL is already generating a 2x frequency clock, the present invention generates a disable pulse to "swallow" one pulse of the 2x clock, thereby delaying one edge of the core clock 326 by a core clock phase in one cycle. FIG. 14 illustrates an example of the 2x clock having one of its pulses swallowed. By swallowing one cycle of the 2x frequency clock, a core clock phase is shifted 180°. By performing the shift, synchronization may be obtained.

FIG. 15 illustrates one embodiment of the circuitry and associated waveforms for shifting the core clock phase. The operation of the circuitry would be well-understood by those skilled in the art. The circuit outputs a zero until it detects core and bus clock signals mismatching in phase. At this point, the core sync signal 1220 goes from low to high, thereby causing a pulse of the 2x frequency clock from the PLL to be swallowed. In one embodiment, this circuitry detects not only the transaction of the core sync signal from zero to one but also from one to zero to allow a return to an uncorrected condition. This may be necessary where the clock signals must be placed in a known state for testing.

Figure 16:
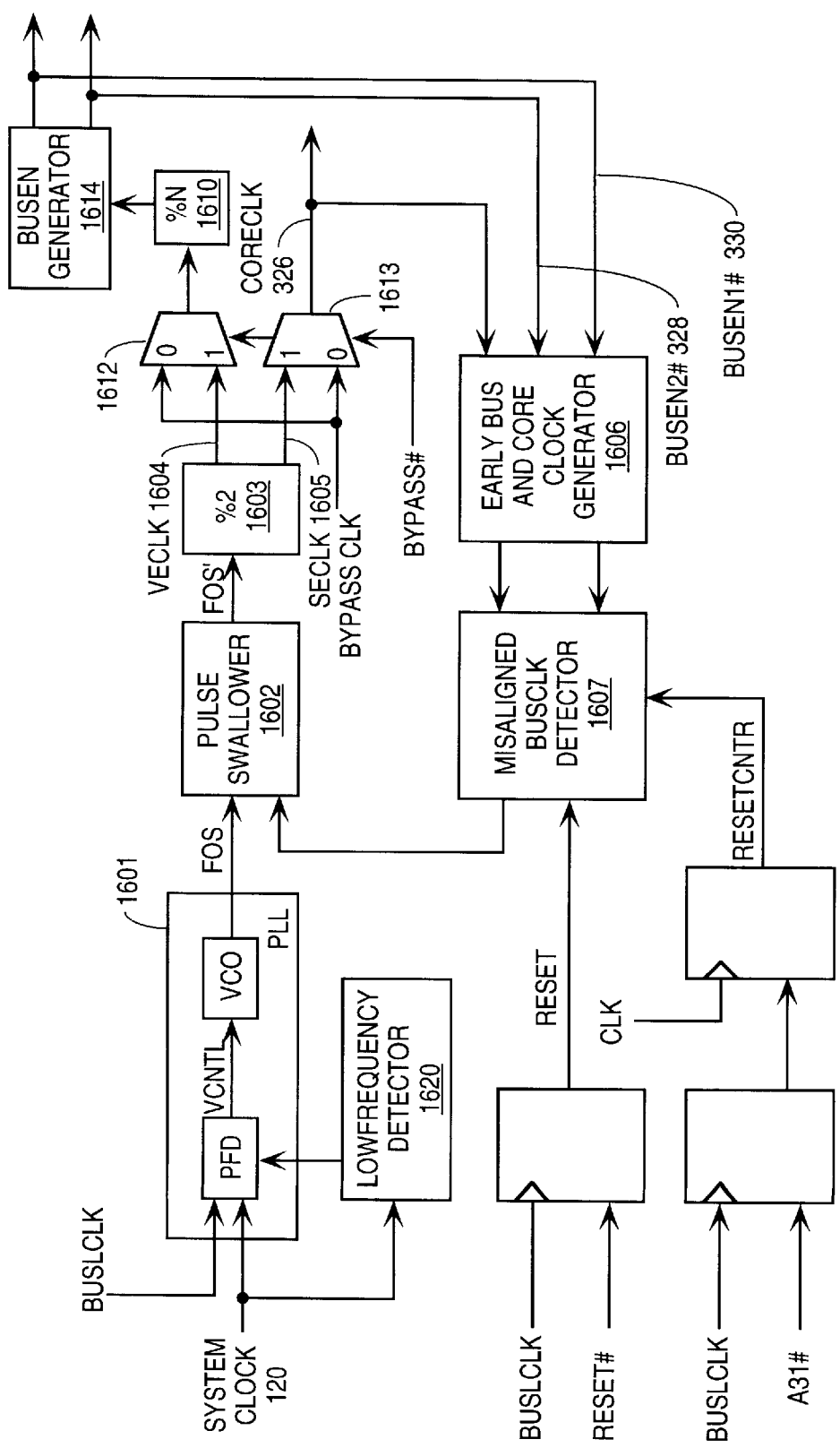
FIG. 16 is a block diagram of one embodiment of the clocking circuit of FIG. 3.

FIG. 16 is a block diagram of one embodiment of clocking circuit 302. PLL 1601 receives system clock 120 and BUSLCLK. PLL 1601 generates a 2x frequency signal FOS as one input to pulse swallower 1602. Pulse swallower 1602 also receives CORESYNC 1220. Based on CORESYNC, pulse swallower 1602 either swallows a pulse of the clock signal to shift the core clock signal one phase or not. The output clock from pulse swallower 1602 is received by a divide-by-two 1603.

The output of divide-by-two 1603 is an unshifted early clock signal UECLK 1604 and a shifted clock signal SECLK 1605. UECLK 1604 is coupled to the one input of multiplexer 1612. The zero input of multiplexer 1612 receives BYPASS CLK. The BYPASS CLK signal may be generated in response to asserting a BYPASS# signal or a BYPASS# pin of processor 100. An exclusive OR gate (XOR) that receives system clock 120 and another external clock signal XXCLK1 may generate BYPASS CLK when the BYPASS# signal is asserted. When BYPASS# is asserted, PLL 1601 may be shut down.

The output of multiplexer 1612 is coupled to divide-by-N 1610, which outputs a signal to bus clock enable generation clock 1605. The outputs of bus clock enable generation block 1614 are BUSEN1# 330 AND BUSEN2# 328 which are sent to the clock distribution spine 304 and the early bus and core clock generator 1606. SECLK 1605 is coupled to the one input of multiplexer 1613. The zero input of multiplexer 1613 is coupled to BYPASS CLK. The output of multiplexer 1613 provides core clock 326. Multiplexers 1612 and 1613 have their select inputs coupled to BYPASS#.

The early bus and core clock generator 1606 generates an early core clock signal and an early bus clock signal which are sent to the detector logic 1607. In one embodiment, these are approximately 4 ns earlier than the regular bus and core clock signals. This early signal allows for shifting the core clock signal when the bus clock signal is not active. If the regular bus clock signal is used, there would not be enough time to perform the shifting. Detector logic 1607 generates CORESYNC 1220 to pulse swallower 1602 in response to the system reset signal (and a reset disable counter signal).

The clocking circuit of FIG. 16 also includes low frequency detector 1620 that receives system clock 120. Low frequency detector 1620 detects when the system clock has dropped below a predetermined frequency or has stopped. When low frequency detector 1620 detects this condition, it causes PLL 1601 to be disabled. This will shut off FOS and core clock 326 and processor 100 will enter the deep sleep state.

Again, with respect to FIGS. 2 and 3, processor 100 enters sleep state 208 from stop grant state 204 and exits sleep state 208 to stop grant state 204 such that bus clock BUSLCLK and bus clock 334 are in a predetermined relationship relative to core clock 326. This predetermined relationship is enabled by the operations of sleep logic 306, logic 312, and clocking circuit 302.

FIG. 17 shows one embodiment for the predetermined relationship of a 1/N (i.e., ⅓) clocking system having 14 core clock cycles for core clock 326 and 5 bus clock cycles for bus clock 334 (which also may be BUSLCLK output by BUSCLK generation logic 308, or BUSRCLK output by BUSCLK generation logic 310). In one embodiment, sleep logic 306, logic 312, and clock circuit 302 cause processor 100 to enter and exit sleep state 208 the first core clock cycle after a bus clock cycle. Thus, processor 100 may enter and exit sleep state in core clock cycles 2, 5, and 8. Other embodiments may choose other cycles.

FIG. 18 shows one embodiment for the predetermined relationship between core clock and bus clock of a 2/N (i.e., ⅔) clocking system having 14 core clock cycles for core clock 326 and 5 bus clock cycles for bus clock 334 (which also may be BUSLCLK output by BUSCLK generation logic 308, or BUSRCLK output by BUSCLK generation logic 310). For one embodiment, sleep logic 306, logic 312, and clock circuit 302 cause processor 100 to enter and exit sleep state 208 the first core clock cycle after a misaligned bus clock cycle. For example, processor 100 may enter and exit sleep state in core clock cycles 4, 9, and 14. Other embodiments may choose other cycles. Since the SLEEP signal may be deasserted when bus clock 334 is aligned or misaligned with core clock 326, logic 312 uses CLKALIGN 336 and the core synchronization logic in clocking circuit 302 to guarantee that processor 100 exits sleep state 208 the first core clock cycle after a misaligned bus clock cycle as will be described below. In one embodiment, exit latency from sleep state 208 to stop grant state 206 will be a constant 2 bus clock cycles after deassertion of SLEEP as will be described below.

Figure 19:
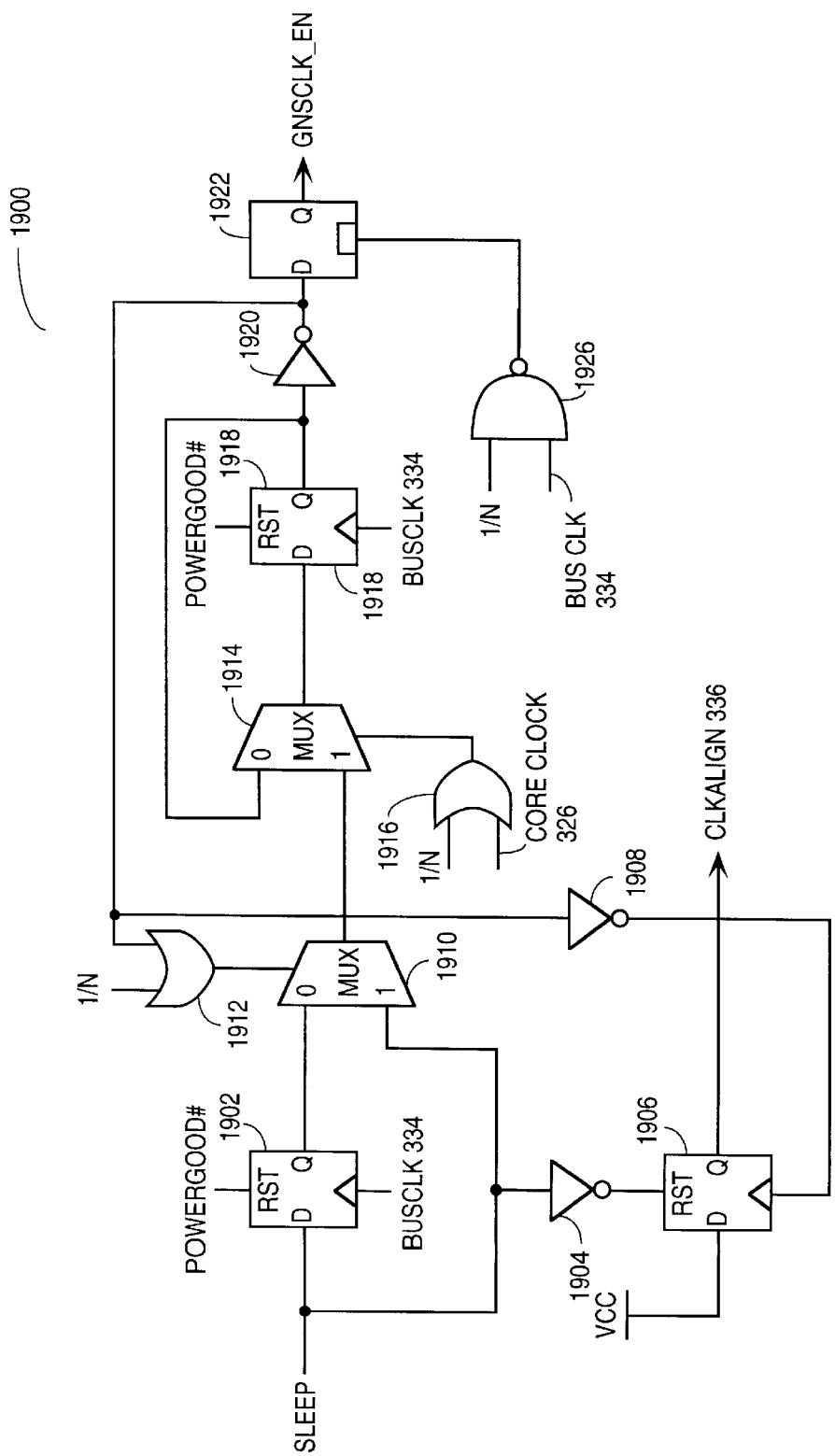
FIG. 19 is one embodiment of the GNSCLK_EN and CLKALIGN generation logic of FIG. 3.

FIG. 19 shows logic 1900 that is one embodiment of logic 312. Logic 1900 causes processor 100 to enter and exit sleep mode in both 1/N and 2/N clocking modes while maintaining the core clock/bus clock alignments indicated with respect to FIGS. 17 and 18. Logic 1900 includes flip-flop 1902 that receives SLEEP at its D input, has its Q output coupled to the zero input of multiplexer 1910, has its reset input coupled to POWERGOOD#, and is clocked by bus clock 334 (bus clock 334 may also be BUSLCLK). POWERGOOD# is a signal that indicates that the power supply to processor 100 or the PLL in clock circuit 302 is stable (POWERGOOD# logic low). Multiplexer 1910 has its one input is coupled to SLEEP, its select input is coupled to the output of OR gate 1912, and its output is coupled to the one input of multiplexer 1914. The other input of OR gate 1912 is coupled to 1/N. Multiplexer 1914 has its zero input coupled to the output of flip-flop 1918, its select input coupled to the output of OR gate 1916, and its output coupled to the D input of flip-flop 1918. OR gate 1916 has one input coupled to 1/N and the other input coupled to core clock 326. The Q output of flip-flop 1918 is coupled to the input of inverter 1920. The output of inverter 1920 is coupled to the D input of half latch 1922, the input of inverter 1908, and one input of OR gate 1912. The output of half latch 1922 generates GNSCLK_EN. Half latch 1922 is clocked by NAND gate 1924 that has one input coupled to 1/N and the other input coupled to bus clock 334. Inverter 1908 has its output configured to clock flip-flop 1906.

Flip-flop 1906 has its reset input coupled to the output of inverter 1904, its D input coupled to VCC, and its Q output generating CLKALIGN 336. The input of inverter 1904 is coupled to SLEEP.

The operation of logic 1900 is illustrated by the illustrative waveforms shown in FIGS. 20 through 25. These waveforms show processor 100 entering and exiting sleep state 208 such that core clock 326 is in a predetermined relationship with bus clock 334 according to the criteria outlined in FIGS. 17 and 18. Other criteria may be used for alternative embodiments. Additionally, processor 100 may further enter and exit deep sleep state 210 from sleep state 208 in FIGS. 20–25 such that the PLL can be shut off and then be powered up with core clock 326 and bus clock 334 having a deterministic phase relationship. As previously described, this also enables the sleep and deep sleep states, and the power down during these states, to be tested by automated testing equipment.

Figure 20:
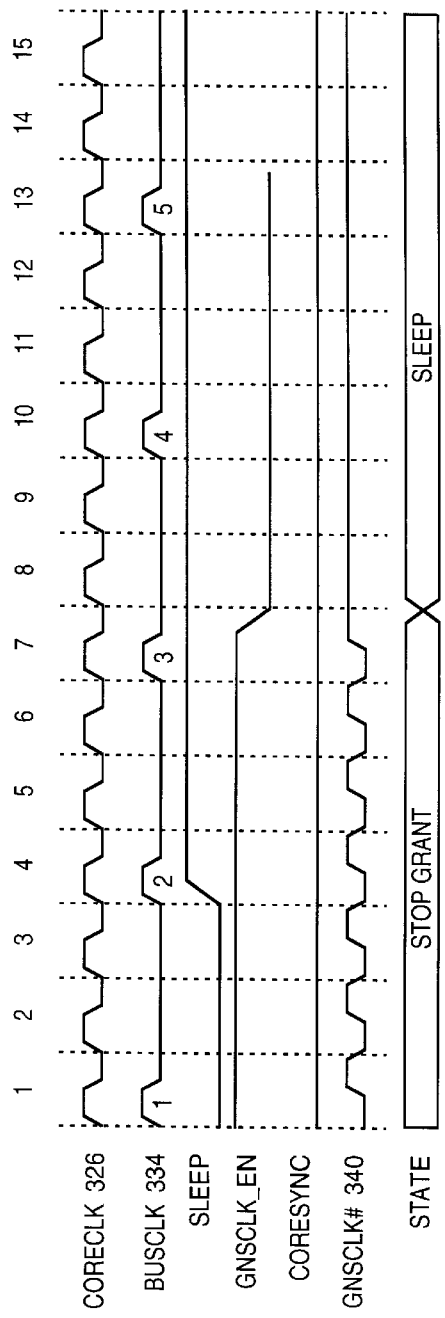
FIG. 20 is a waveform diagram that illustrates one embodiment of entering the sleep mode in ⅓ clock mode.

FIG. 20 shows entering sleep state 208 from stop grant state 206 in the 1/N clocking mode. The 1/N clocking mode always has bus clock 334 aligned with core clock 326. FIG. 20 shows that the SLEEP signal is asserted by sleep logic 306 in bus clock cycle 2. Multiplexers 1910 and 1914 will pass SLEEP through to flip-flop 1918 which will allow SLEEP to be passed to inverter 1920 in bus clock cycle 3. Half latch 1922 will be open when the output of NAND gate 1924 is a logic one, thus GNSCLK_EN will be deasserted in the low phase of bus clock cycle 3. This will cause GNSCLK# to be disabled and processor 100 to enter sleep state 208 one core clock cycle after the first bus clock cycle from when SLEEP was asserted. CORESYNC generated by the core synchronization logic in clocking circuit 302 remains low because there is not core clock correction in 1/N mode.

FIG. 23 shows exiting sleep state 208 to stop grant state 206 in the 1/N clocking mode. FIG. 23 shows that the SLEEP signal is deasserted by sleep logic 306 in bus clock cycle 2. Multiplexers 1910 and 1914 will pass SLEEP through to flip-flop 1918 which will allow SLEEP to be passed to inverter 1920 in bus clock cycle 3. GNSCLK_EN will then be asserted in the low phase of bus clock cycle 3. This will cause GNSCLK# to be enabled and processor 100 to enter stop grant state 206 one core clock cycle after the first bus clock cycle from when SLEEP was deasserted.

Figure 21:
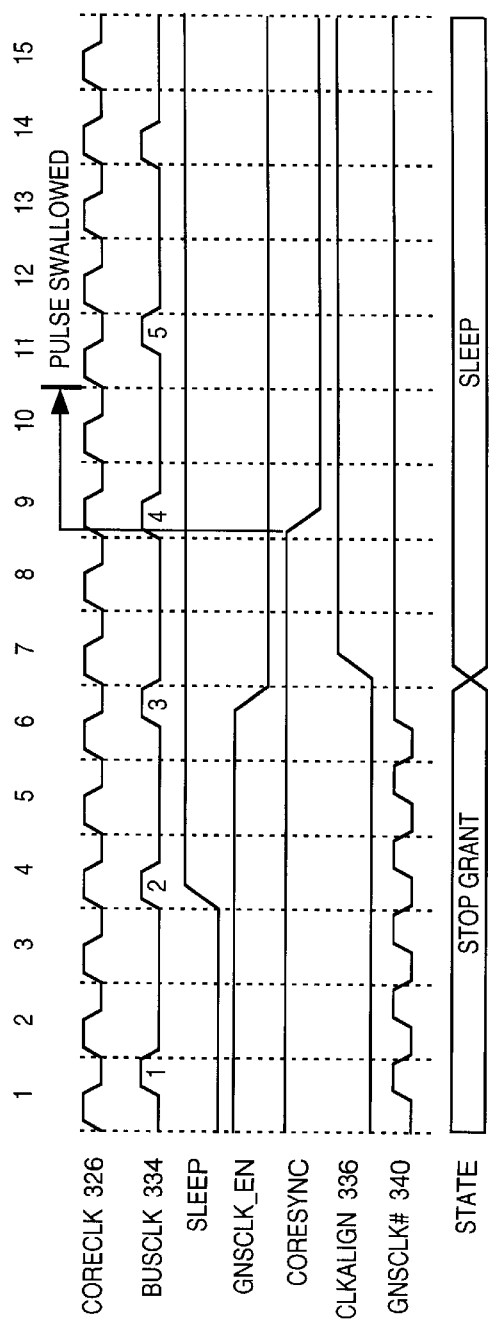
FIG. 21 is a waveform diagram that illustrates one embodiment of entering the sleep mode in an aligned bus clock cycle and ⅖ clock mode.

FIG. 21 shows entering sleep state 208 from stop grant state 206 in the 2/N clocking mode where the SLEEP signal is asserted in a bus clock cycle that is aligned with a core clock cycle. SLEEP is asserted in bus clock cycle 2, and multiplexers 1910 and 1914 will pass SLEEP to flip-flop 1918 on the first core clock cycle after bus clock cycle 2. Flip-flop 1918 will then clock SLEEP through to inverter 1920 in misaligned bus clock cycle 3, and GNSCLK_EN will be deasserted causing GNSCLK# to be disabled and processor 100 to enter sleep state 208 one core clock cycle after the first misaligned bus clock cycle after SLEEP is asserted.

The output of inverter 1908 will also cause flip-flop 1906 to assert CLKALIGN 336 in core clock cycle 7. Subsequently, the core synchronization logic in clocking circuit 302 will cause CORESYNC to be deasserted in bus clock cycle 4 and cause a subsequent phase shift to the core clock in core clock cycle 11. The CORESYNC signal was previously asserted due to prior core clock correction in the 2/N clocking mode. That is, a pulse will be swallowed. The CORESYNC signal is deasserted such that when sleep state 208 is exited to return to stop grant state 204, CORESYNC may need to be transitioned to the high state such that a subsequent phase shift will occur to core clock 326 if SLEEP is deasserted when the bus clock is misaligned with the core clock. For an alternative embodiment, CORESYNC does not cause a phase shift in core clock 326 when CORESYNC is deasserted.

FIG. 22 shows entering sleep state 208 from stop grant state 206 in the 2/N clocking mode where SLEEP is asserted in a bus clock cycle that is misaligned with a core clock cycle. SLEEP is asserted in bus clock cycle 2, and multiplexers 1910 and 1914 will pass SLEEP to flip-flop 1918. Flip-flop 1918 will then clock SLEEP through to inverter 1920 in aligned bus clock cycle 3. GNSCLK_EN will then be deasserted in misaligned bus clock 4 causing GNSCLK# to be disabled and processor 100 to enter sleep state 208 one core clock cycle after the first misaligned bus clock cycle after SLEEP is asserted.

The output of inverter will also cause flip-flop 1906 to assert CLKALIGN 336 in core clock cycle 9. Subsequently, the core synchronization logic in clocking circuit 302 will cause CORESYNC to be deasserted in bus clock cycle 5 and cause a subsequent phase shift to the core clock in core clock cycle 13. For an alternative embodiment, CORESYNC does not cause a phase shift in core clock 326 when CORESYNC is deasserted.

FIG. 24 shows exiting sleep state 208 to stop grant state 206 in the 2/N clocking mode where SLEEP is deasserted in a bus clock cycle that is aligned with a core clock cycle. SLEEP is deasserted in aligned bus clock cycle 2 causing flip-flop 2206 to reset and CLKALIGN 336 to be deasserted. In bus clock cycle 3, CORESYNC will be asserted because bus clock cycle 3 is misaligned with core clock 326. This will cause a phase correction to core clock 326 in core clock cycle 8 such that the bus clock will be misaligned with the core clock in bus clock cycle 4. Misaligned bus clock cycle 4 will then clock SLEEP from flip-flop 1918 and cause GNSCLK_EN to be asserted. With GNSCLK_EN asserted, processor 100 may reenter stop grant state 204 one core clock cycle after the misaligned bus clock cycle 4. Therefore, there is an exit latency of 2 bus clock cycles.

FIG. 25 shows exiting sleep state 208 to stop grant state 206 in the 2/N clocking mode where SLEEP is deasserted in a bus clock cycle that is misaligned with a core clock cycle. SLEEP is deasserted in misaligned bus clock cycle 2 causing flip-flop 1906 to reset and CLKALIGN 336 to be deasserted. In bus clock cycle 3, CORESYNC will not be asserted because bus clock cycle 3 is aligned with core clock 326. Thus, no phase correction to core clock 326 will occur. Misaligned bus clock cycle 4 will then clock SLEEP from flip-flop 1918 and cause GNSCLK_EN to be asserted. With GNSCLK_EN asserted, processor 100 may reenter stop grant state 204 one core clock cycle after the misaligned bus clock cycle 4. Therefore, there is an exit latency of 2 bus clock cycles.

Figure 27:
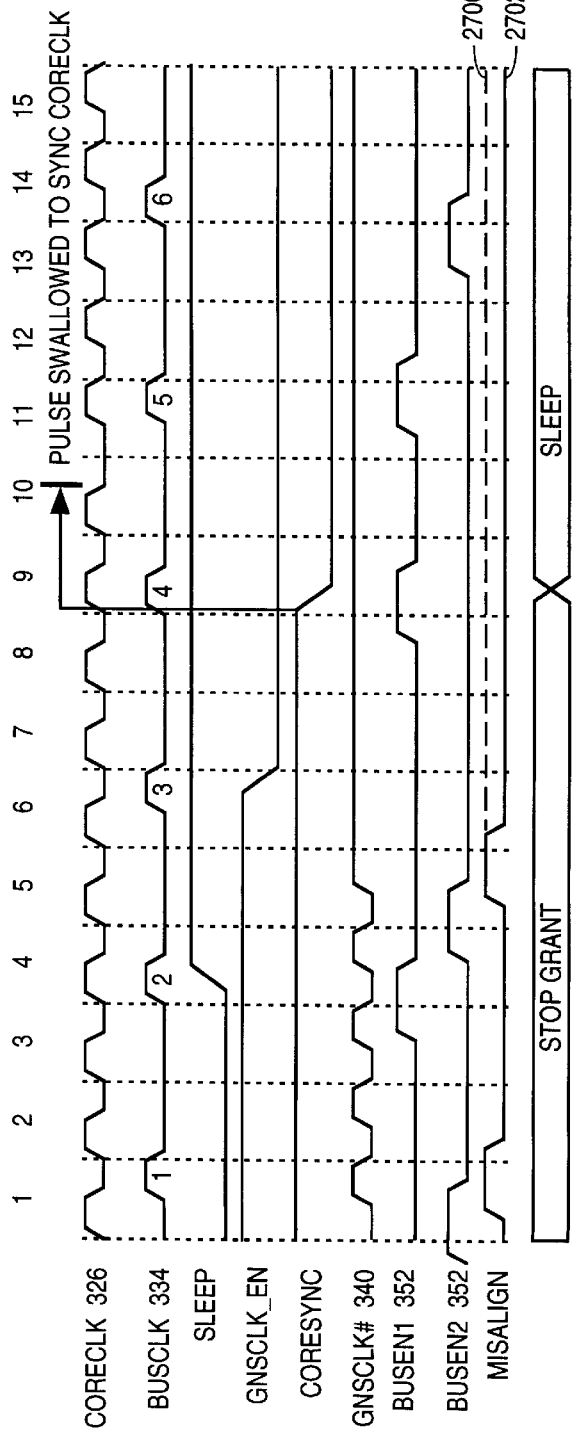
FIG. 27 is a waveform diagram that illustrates one embodiment of the operation of the Reset Misalign logic entering the sleep mode in an aligned bus clock cycle and ⅖ clock mode.

The bus enable signals BUSEN1 352 and BUSEN2 350 coupled to BUSCLK generation logic 310 may be used to generate BUSRCLK for the right side pad interface circuit 112 as previously described. For one embodiment, BUSEN1 352 is an align pulse that is asserted in those bus clock cycles that are aligned with core clock 326. For example, FIG. 27 shows that BUSEN1 352 is asserted high in aligned bus clock cycles 2, 4, and 5. BUSEN2 350 is a misalign pulse that may be asserted in those bus clock cycles misaligned with core clock 326. For example, FIG. 27 shows that BUSEN2 350 is asserted high in misaligned bus clock cycles 1, 3, and 6.

Figure 26:
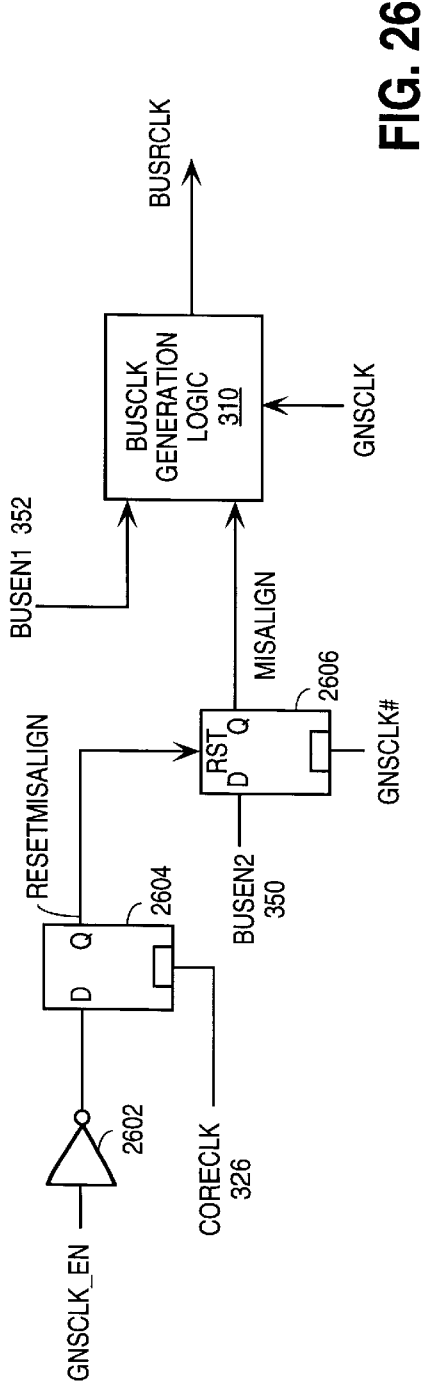
FIG. 26 is a circuit diagram of one embodiment of Reset Misalign logic.

A half latch that is open when GNSCLK# is low may be coupled between BUSEN2 350 and BUSCLK generation logic 310 to generate a misalign clock pulse MISALIGN that is one phase later than BUSEN2 350. The MISALIGN signal may be used by BUSCLK generation logic 310 to generate BUSRCLK. In this example, when GNSCLK_EN is deasserted and processor 100 enters sleep state 208, the inserted half latch will cause MISALIGN to remain high so long as GNSCLK_EN is deasserted and GNSCLK# are disabled. This is represented in FIG. 27 by dashed line 2700. This may cause bus clock contention problems for BUSCLK generation logic 310 and cause BUSRCLK to be corrupted. FIG. 26 illustrates reset misalign circuit 2600 that may be used to remedy this situation.

Reset misalign circuitry 2600 includes the half latch 2606 that receives BUSEN2 350 and is clocked by GNSCLK#. The reset input of half latch 2606 is coupled to the RESETMISALIGN signal that is generated by half latch 2604. Half latch 2604 is clocked by core clock 326 that receives an inverted GNSCLK_EN signal from inverter 2602. When GNSCLK_EN is deasserted in response to SLEEP being asserted, the next core clock cycle following the bus clock cycle that deasserts GNSCLK_EN will cause RESETMISALIGN to reset half latch 2606 such that MISALIGN is low. FIG. 27 shows that in core clock 7, half latch 2606 is reset by RESETMISALIGN and MISALIGN is set low as indicated by line 2702.

Although the present invention has been described in terms of specific embodiments, it will be appreciated that various modifications and alterations might be made by those skilled in the art without departing from the spirit and scope of the invention. The invention should therefore be measured in terms of the claims which follow.

What is claimed is:

1. A processor comprising:
   a clock generator circuit to generate a core clock signal and a bus clock signal in response to an external clock signal;
   a first input coupled to receive a first power down signal; and
   a first interface circuit coupled to the clock generator circuit and the first input, wherein the processor enters a first power down state when the core clock signal and the bus clock signal are out of phase with each other.

2. The processor of claim 1, wherein when the first power down signal is deasserted, the processor exits the first power down state when the core clock signal and the bus clock signal are out of phase with each other.

3. The processor of claim 1, wherein the clock generator circuit includes a phase-locked loop (PLL) circuit.

4. The processor of claim 3, wherein the PLL is disabled when a second power down signal is asserted and the external clock signal is disabled, and wherein the PLL circuit is restarted when the external clock signal is asserted and the second power down signal is deasserted.

5. The processor of claim 1, further comprising a second input coupled to the first interface circuit and coupled to receive a second power down signal.

6. (Twice Amended) The processor of claim 5, wherein when the first power down signal is asserted and the second power down signal is deasserted, the processor enters the first power down state and draws a first amount of power, and when the second power down signal is asserted and the first power down signal is asserted, the processor enters a second power down state and draws a second amount of power that is less than the first amount of power.

7. The processor of claim 6, wherein when the second power down signal is asserted, the first power down signal is asserted, and the external clock signal is disabled, the processor enters a a third power down state and draws a third amount of power that is less than the second amount of power.

8. The processor of claim 6, wherein the clock generator circuit further generates a first clock signal, a second clock signal, and a third clock signal, wherein the first interface circuit is coupled to receive the first clock signal, and wherein the processor further comprises:
   core circuitry coupled to receive the second clock signal; and
   a second interface coupled to receive the third clock signal.

9. The processor of claim 8, wherein when the first power down signal is asserted, the second clock signal is disabled, when the second power down signal is asserted, the third clock signal is disabled, and when the external clock signal is disabled, the first clock signal is disabled.

10. The processor of claim 8, wherein the first interface circuit comprises a sleep circuit configured to assert an internal sleep signal when the first and second power down signals are asserted, and wherein the clock generator circuit comprises:
    a clocking circuit to generate the core clock signal and the bus clock signal; and
    logic coupled to generate a clock enable signal in response to the bus clock signal, the core clock signals, and the internal sleep signal.

11. The processor of claim 10, wherein the first interface circuit further comprises a bus clock generation circuit coupled to receive the first clock signal and a plurality of bus enable signals from the clocking circuit, the bus clock generation circuit to provide a feedback bus clock signal to the clocking circuit.

12. The processor of claim 11, wherein the feedback bus clock signal has one pulse for every N core clock signals, wherein N is an integer at least equal to 2.

13. The processor of claim 11, wherein the feedback bus clock signal has two pulses for every N core clock signals, wherein N is an integer at least equal to three.

14. The processor of claim 10, wherein the logic generates a clock align signal when the clock enable signal is deasserted, wherein the clock align signal causes the clocking circuit to phase shift the core clock signal.

15. The processor of claim 10, wherein when the clock enable signal is asserted the third clock signal is enabled, and when the clock enable signal is deasserted the third clock signal is disabled.

16. The processor of claim 15, further comprising a NAND gate coupled to receive the core clock signal and the clock enable signal and to generate the third clock signal.

17. The processor of claim 16, wherein the logic further generates the clock enable signal when the bus clock and core clock are out of phase with each other.

18. A processor comprising:
    means for generating a core clock signal and a bus clock signal in response to an external clock signal; and
    means for receiving an external sleep signal, wherein when the external sleep signal is asserted the processor enters a sleep state when the core clock signal and the bus clock signal are out of phase with each other.

19. A method of powering down an integrated circuit having a clock generator circuit that receives an external clock signal and generates a core clock signal and a bus clock signal, the method comprising the steps of:

entering a first power down mode in response to receiving a first power down signal; and entering a second power down mode in response to receiving a second power down signal, wherein the integrated circuit enters the second power down mode when the core clock signal and the bus clock signal are out of phase with each other.

20. A processor comprising:

a clock circuit to generate a core clock signal and a bus clock signal in response to an external clock signal;

a first input to receive a first power down signal, wherein the processor enters a first power down state in response to the first signal;

a second input to receive a second signal;

an interface circuit, coupled to the clock circuit and the first and second inputs, to generate a sleep signal in response to the first and second power down signals; and a logic circuit, coupled to the clock circuit, to enable the processor to enter a second power down state in response to the sleep signal, the core clock signal, and the bus clock signal, wherein the processor draws less power in the second power down state than in the first power down state.

* * * * *

UNITED STATES PATENT AND TRADEMARK OFFICE
CERTIFICATE OF CORRECTION

PATENT NO. : 6,021,500
DATED : February 1, 2000
INVENTOR(S) : Wang et al.

It is certified that error appears in the above-identified patent and that said Letters Patent is hereby corrected as shown below:

In column 5, at line 63, delete "112" and insert --104--.
In column 10, at line 17, delete "dock" and insert --clock--.
In column 14, at line 16, delete "docked" and insert --clocked--.
In column 18, at line 16, delete "dock" and insert --clock--.
In column 18, at line 21, delete "dock" and insert --clock--.
In column 18, at line 31, delete "2206" and insert --1906--.

Signed and Sealed this

Thirteenth Day of February, 2001

Attest:

NICHOLAS P. GODICI

Attesting Officer

Acting Director of the United States Patent and Trademark Office